United States Patent
Ito et al.

(10) Patent No.: US 7,489,339 B2
(45) Date of Patent: Feb. 10, 2009

(54) PRINT SYSTEM, AND PRINTER AND DIGITAL CAMERA MAKING UP SYSTEM

(75) Inventors: Junichi Ito, Fuchu (JP); Yoshio Fukuda, Hino (JP)

(73) Assignee: Olympus Corporation, Tokyo (JP)

( * ) Notice: Subject to any disclaimer, the term of this patent is extended or adjusted under 35 U.S.C. 154(b) by 883 days.

(21) Appl. No.: 10/715,332

(22) Filed: Nov. 17, 2003

(65) Prior Publication Data

US 2004/0190047 A1 Sep. 30, 2004

(30) Foreign Application Priority Data

Nov. 20, 2002 (JP) ............... 2002-336997

(51) Int. Cl.
*H04N 5/225* (2006.01)
*H04N 3/14* (2006.01)

(52) U.S. Cl. ................ 348/207.2; 348/333.02

(58) Field of Classification Search ............ 396/57; 348/207, 333
See application file for complete search history.

(56) References Cited

U.S. PATENT DOCUMENTS

| | | | | | |
|---|---|---|---|---|---|
| 4,332,445 | A | * | 6/1982 | Hosono | 396/205 |
| 5,726,556 | A | * | 3/1998 | Yoshihara et al. | 320/106 |
| 6,002,436 | A | * | 12/1999 | Anderson | 348/372 |
| 6,163,132 | A | * | 12/2000 | Higuchi et al. | 320/132 |
| 6,464,317 | B2 | * | 10/2002 | Miyazawa | 347/14 |
| 6,515,704 | B1 | * | 2/2003 | Sato | 348/333.11 |
| 6,580,460 | B1 | * | 6/2003 | Takahashi et al. | 348/372 |
| 6,661,454 | B1 | * | 12/2003 | Hwang et al. | 348/231.1 |
| 6,693,665 | B1 | * | 2/2004 | Shindo et al. | 348/207.2 |
| 6,771,896 | B2 | * | 8/2004 | Tamura et al. | 396/57 |
| 7,139,027 | B1 | * | 11/2006 | Fredlund et al. | 348/333.07 |
| 2002/0003576 | A1 | * | 1/2002 | Konishi et al. | 348/232 |
| 2002/0071035 | A1 | * | 6/2002 | Sobol | 348/207 |

FOREIGN PATENT DOCUMENTS

| | | |
|---|---|---|
| CN | 1356627 | 7/2002 |
| JP | 04-333892 | 11/1992 |
| JP | 08-139971 | 5/1996 |
| JP | 10-200850 | 7/1998 |
| JP | 11-088744 | 3/1999 |
| JP | 11-243651 | 9/1999 |
| JP | 2001-066658 | 3/2001 |
| JP | 2001-080174 | 3/2001 |
| JP | 2001-086651 | 3/2001 |
| JP | 2002-165116 | 6/2002 |
| JP | 2002-191000 | 7/2002 |
| JP | 2002-237972 | 8/2002 |
| JP | 2002-281374 | 9/2002 |

OTHER PUBLICATIONS

Chinese Office Action for Application No. 2003101152253, issued Jan. 26, 2007 (2 cover pgs. and 6 pgs. of text) (with English Translation of text (6 pgs.)).

* cited by examiner

*Primary Examiner*—Justin P Misleh
(74) *Attorney, Agent, or Firm*—Straub and Pokotylo; John C. Pokotylo

(57) ABSTRACT

In a print system including a digital camera and a printer functionally connected, a secondary battery of the camera is charged by receiving electric power supplied from the printer. The digital camera displays the state of the secondary battery.

10 Claims, 16 Drawing Sheets

PRINT SYSTEM, AND PRINTER AND DIGITAL CAMERA MAKING UP SYSTEM

This application claims the benefit of Japanese Application No. 2002-336,997 filed Nov. 20, 2002, the contents of which are incorporated by this reference.

BACKGROUND OF THE INVENTION

1. Field of the Invention

The present invention relates to a print system wherein a digital camera and a printer are functionally connected one to another so as to perform operations while communicating with each other, and the printer and the digital camera, making up the system, and particularly to a technique wherein a secondary battery employed for the digital camera can be charged by supplying power thereto from the printer with the user being enabled to monitor the state of the secondary battery using display means of the digital camera.

2. Related Background Art

Conventionally, various proposals have been made with regard to a print system formed of a digital still camera for recording electronic digital image data obtained by performing photoelectric conversion for an optical image into an digital image, and an image printing device (which will be referred to as "printer" hereafter) such as a printer or the like for printing an image on a printing paper sheet, which has been formed from digital data which has been taken and recorded by an image input device such as a digital still camera or the like (which will be referred to as "digital camera" hereafter).

The present applicant has earlier made a proposal for a print system formed of a digital camera and a printer for printing an image taken by the digital camera, as disclosed in Japanese unexamined Patent Application Publication No. 10-200850, and the like. The means disclosed in this Japanese Unexamined Patent Application Publication No. 10-200850 has a configuration wherein an image corresponding to image data which is selected to be printed is displayed with a display unit on the digital camera so that the user can confirm the image, and the image data corresponding to the image thus confirmed is transmitted to the printer. Such a configuration enables operations such as selection and confirmation of an image which is to be printed, and printing of the user-desired image, to be easily performed in a sure manner.

Furthermore, the present applicant has proposed a technique disclosed in Japanese Unexamined Patent Application Publication No. 2001-80174, and the like. An arrangement disclosed in this Japanese Unexamined Patent Application Publication No. 2001-80174 has a configuration wherein a remaining battery power measuring circuit is included for measuring the remaining battery power required for determining whether or not the battery of the digital camera is dead (which will be also referred to as "low-battery state" hereafter), and in the event that the remaining battery power is determined to be smaller than a predetermined level (low battery level) required for performing operations of the digital camera (in the event that a low battery state is detected), the print processing which is being performed at that time is stopped, as well as switching off the power source of the digital camera so as to prevent unexpected trouble.

Furthermore, the present applicant has proposed a technique wherein a digital camera is charged by a dedicated charger, disclosed in Japanese Unexamined Patent Application Publication No. 2001-86651, and the like. With the means disclosed in Japanese Unexamined Patent Application Publication No. 2001-86651, the aforementioned charger has a configuration wherein even in the event that a camera cannot perform operations due to low voltage of a secondary battery employed in the digital camera, the operations such as output of recording image data to an external device or the like can be immediately performed without waiting for completion of charge of the secondary battery up to a predetermined voltage level sufficient for the camera performing operations, thereby improving availability thereof. That is to say, the aforementioned charger has a configuration wherein upon the charger being connected to the digital camera, the charger charges the secondary battery of the camera, as well as directly supplying electric power to the digital camera so as to enable the digital camera to be perform the operations such as output of recording image data, or the like.

Furthermore, the present applicant has proposed display means for displaying various kinds of information with regard to a digital camera such as information with regard to the charging state of the battery, information with regard to image taking, or the like, disclosed in Japanese Unexamined Patent Application Publication No. 2001-66658, and the like. The aforementioned means disclosed in Japanese Unexamined Patent Application Publication No. 2001-66658 is a system formed of a digital camera and a charger, wherein the system includes first display means for displaying information with regard to the charging state of the digital camera, and second display means for displaying the information with regard to image taking operations of the digital camera, and the digital camera has a configuration wherein the aforementioned first display means and second display means are disposed on the same window portion of a casing of the digital camera, thereby enabling clear display for notifying the charging state at the user-desired time according to the user-operation for the digital camera, without display means included in the charger. Thus, the above-described system has the advantage of preventing user error in charging operations, as well as improving ease of use.

SUMMARY OF THE INVENTION

With a print system formed of a digital camera and a printer according to the present invention, the aforementioned print system is formed of a digital camera and a printer, each including control means for controlling operations thereof, functionally connected one to another, and the digital camera has a configuration wherein the data forming an image which is to be printed with the printer can be supplied to the printer, a secondary battery, which is a power source thereof, can be charged by receiving electric power supplied from the printer, and the state of each function including the state of the secondary battery can be displayed on a predetermined display unit, under control of the control means thereof; the printer has a configuration wherein an image can be printed based upon the image data supplied from the digital camera, and electric power can be supplied to the digital camera so as to charge the secondary battery thereof, under control of the control means thereof; and the digital camera has a configuration wherein in the event that the digital camera and the printer are functionally connected one to another, a display arrangement is displayed on a predetermined display unit thereof for notifying the state of the secondary battery.

Advantages of the present invention will become apparent from the following description of the preferred example.

BRIEF DESCRIPTION OF THE DRAWINGS

FIG. 6 is a diagram which illustrates a display example for the information with regard to the charging state of the secondary battery of the digital camera forming the print system shown in FIG. 1, or the like;

FIG. 7 is a diagram which illustrates another display example for the information with regard to the charging state of the secondary battery of the digital camera forming the print system shown in FIG. 1, or the like;

FIG. 8 is a diagram which further illustrates another display example for the information with regard to the charging state of the secondary battery of the digital camera forming the print system shown in FIG. 1, or the like;

FIG. 10 is a diagram which further illustrates another display example for the information with regard to the charging state of the secondary battery of the digital camera forming the print system shown in FIG. 1, or the like;

FIG. 11 is a diagram which further illustrates another display example for the information with regard to the charging state of the secondary battery of the digital camera forming the print system shown in FIG. 1, or the like;

FIG. 13 is a diagram which further illustrates another display example for the information with regard to the charging state of the secondary battery of the digital camera forming the print system shown in FIG. 1, or the like:

DETAILED DESCRIPTION OF THE PREFERRED EMBODIMENTS

Figure 1:
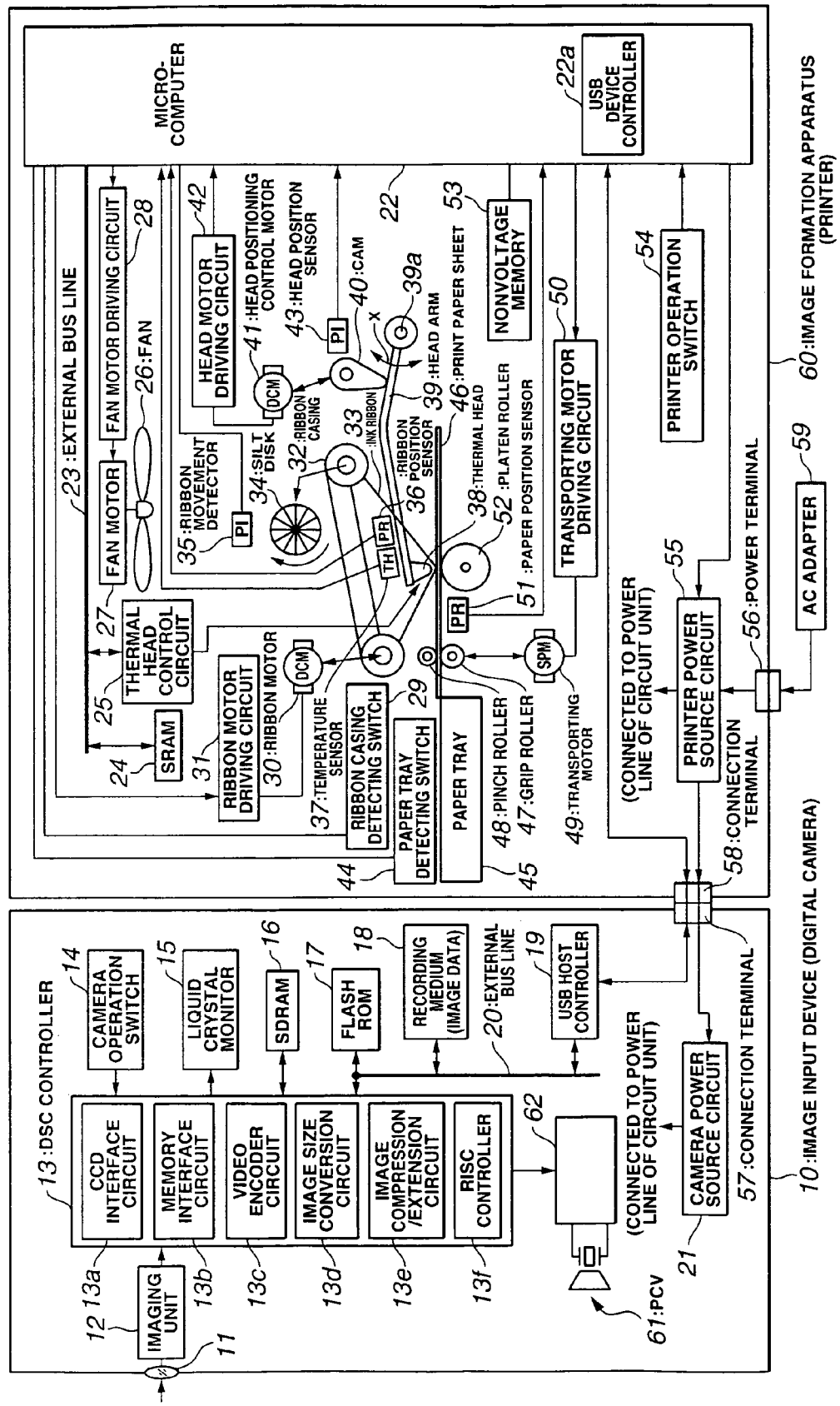
FIG. 1 is a schematic block diagram which shows internal configurations of a digital camera (image input device) and a printer (image formation device) forming a print system according to an embodiment of the present invention.

A print system according to an embodiment of the present invention comprises two devices of an image input device such as a digital camera or the like (which will be referred to as "digital camera" hereafter) 10, and an image formation device 60 such as a thermal sublimation printer (which will be referred to as "printer" hereafter), as shown in FIG. 1, wherein both the devices have a configuration wherein one device can be electrically connected to another device so as to communicate with each other with predetermined communication means stipulated by USB (Universal Serial Bus) standards which is a kind of serial interface standard. Furthermore, each of the digital camera 10 and the printer 60 include control means (a DSC controller 13 and a microcomputer 22, which will be described later) for controlling the operations of the corresponding device.

That is to say, the print system according to the present embodiment comprises the digital camera 10 and the printer 60, each including control means (DSC controller 13 and microcomputer 22) for controlling the operations of the corresponding device, functionally connected one to another.

First, description will be made regarding principal components forming an internal configuration of the digital camera 10 with reference to FIG. 1.

The digital camera 10 forming a part of the print system according to the present embodiment comprises an image-taking optical system 11 formed of multiple optical components or the like for forming an optical object image by focusing the light flux from the subject, an imaging unit 12 formed of a photoelectric conversion device (imaging device such as a CCD (Charge-Coupled Device) or the like), and a driving circuit for driving the imaging device, a DSC (Digital Still Camera) controller 13 formed of a system LSI (Large Scale Integration Circuit) or the like, for example, serving as control means for centrally controlling the operations of digital camera 10 for performing functions thereof as an image input device, a camera operation switch 14 formed of multiple switch members operating synchronously with operation members or the like (not shown; electric components included in a circuit unit of the digital camera 10, e.g., a release button for instructing the start of the image-taking operation, power button for on/off switching operation of a power source, a frame No. selecting button for selecting the No. of image data which is to be displayed, or the No. of desired image data which is to be printed, and the like) for generating instruction signals or the like for instructing various kinds of settings, operations, or the like, for the present digital camera 10, which performs operations according to multiple operation units (not shown) for the user performing input operations, a liquid crystal monitor 15 serving as display means for displaying the state of the corresponding devices including the state of the image formed based upon the image data obtained by the digital camera 10, and the state of a secondary battery 64 (which will be described later: see FIG. 2) on a predetermined display unit thereof under control of the DSC controller 13, SDRAM (Synchronous Dynamic Random Access Memory) 16 for temporarily storing image data, various kinds of data, or the like, which is a semiconductor memory device serving as temporary memory means, flash ROM 17 which is semiconductor memory (ROM; Read Only Memory) which can be electronically rewritten, a recording medium 18 employed as necessary, for recording image data acquired by the imaging unit 12 and subjected to predetermined signal processing by the DSC controller 13 in a predetermined format (e.g., compression format such as JPEG format or the like), e.g., a semiconductor memory medium (e.g., SSFDC (Solid State Floppy Disk Card), CF (Compact Flash), or the like), a magnetic recording medium, optical recording medium, or the like, a USB host controller 19 serving as connecting means for connecting the digital camera 10 and the printer 60 one to another, which forms a part of image data transmission means for transmitting image data or the like from the digital camera 10 to the printer 60, a PCV 61 serving as warning means for giving the user audio warning, an audio circuit 62 for driving the PCV 61 under control of the DSC controller 13, a secondary battery 64 (not shown in FIG. 1; see FIG. 2 described later) which is a rechargeable battery, and the like, and further comprises a camera power source circuit 21 formed of an electric circuit for performing control of electric power supplied from the secondary battery 64, a connection terminal 57 forming a part of connecting means for being connected to a connection terminal 58 of the printer 60 so as to connect the digital camera 10 and the printer 60 one to another, and the like.

The DSC controller 13 serves as control means for centrally controlling the digital camera 10 as described above. Accordingly, the DSC controller 13 has an internal configuration including a CCD interface circuit 13a for receiving image signals of the subject image taken by the imaging unit 12, a memory interface circuit 13b introduced between the CCD interface circuit 13a and the SDRAM 16, serving as means for electrically connecting these components one to another through signal lines, a video encoder circuit 13c for performing signal processing or the like for acquiring image data subjected to predetermined signal processing (image size conversion processing or the like) based upon the image data temporarily stored in the SDRAM 16, and performing signal processing for converting the acquired image data into data in a format required for display on the display unit of the liquid crystal monitor 15, or the like, an image size conversion circuit 13d, controlled by a RISC controller 13f described later, for converting the size of the image into the desired one based upon the image data temporarily stored in the SDRAM 16 such that the image data with the converted image size is suitable for the display resolution of the liquid crystal monitor 15, an image compression/expansion circuit 13e for performing coding, decoding, or the like, of image data, a RISC (Reduced Instruction Set Computer) controller 13f for controlling the internal circuit of the DSC controller 13, and the like.

The DSC controller 13 can perform all control of the above-described print system with the digital camera 10 and the printer 60 being connected one to another, as well as centrally controlling the digital camera 10 as described above.

In this case, the DSC controller 13 performs control operations by transmitting various kinds of instruction signals, predetermined image data, and the like, to the microcomputer 22 serving as a central controller for the printer 60 included in the printer 60.

The image compression/extension circuit 13e performs coding processing based upon the image data temporarily stored in the SDRAM 16, for forming image data in a predetermined format which is compression processing determined format (e.g., compression data in JPEG format (Joint Photographic Expert Group)). The image data in JPEG format generated by the coding processing is transmitted to the recording medium 18 or the like through the memory interface circuit 13b so as to be stored in a predetermined region on the recording medium 18.

Note that the print system may have a configuration wherein the generated image data in JPEG format is stored in a recording medium or device other than the predetermined region on the recording medium 18, e.g., in a free space of the flash ROM 17 which has stored program codes for the RISC controller 13f beforehand.

Furthermore, the image compression/extension circuit 13e performs decoding processing such as processing wherein the image data (JPEG data or the like) stored in a predetermined compression format in a predetermined recording region on the recording medium 18 is read out through the memory interface circuit 13b, following which the read image data is subjected to predetermined extension processing. The image data subjected to extension processing by the image compression/extension circuit 13e is temporarily stored in the SDRAM 16 or the like through the memory interface circuit 13b.

As described above, the DSC controller 13 receives the image signals converted from the subject image acquired by the imaging unit 12, and performs various kinds of image signal processing or the like for the received image signals so as to generate image data in a predetermined format. The image data or the like thus generated is output to the corresponding components such as the liquid crystal monitor 15, the SDRAM 16, the flash ROM 17, the recording medium 18, the USB host controller 19, or the like, as appropriate.

Note that the DSC controller 13 is electrically connected to the flash ROM 17, the recording medium 18, and the USB host controller 19, through an external bus line 20. This enables reciprocal transmission/reception of the image data or the like between the aforementioned DSC controller 13 and each component.

The connection terminal 57 serves as a part of connecting means for being connected to the connection terminal 58 of the printer 60 so as to connect the aforementioned two devices forming the aforementioned print system (digital camera 10, printer 60).

In the state wherein the digital camera 10 and the printer 60 are connected one to another with the connection terminals 57 and 58, transmission/reception of the image signals or the like subjected to signal processing in a predetermined format, and supply of electric power or the like from the printer 60 to the digital camera 10, are performed, as well as transmission/reception of various kinds of information, instruction signals, control signals, and the like between these devices.

Accordingly, the connection terminal 57 of the digital camera 10 is connected to the USB host controller 19 and the camera power source circuit 21, included within the digital camera 10.

Note that while FIG. 1 shows an example wherein the connection terminals 57 and 58 have a configuration formed of a pair of connectors (terminals), for example, the present invention is not restricted to this example, rather an arrangement may be made wherein divided connectors of power connectors and data connectors are included, or an arrangement may be made wherein the digital camera 10 and the printer 60 can be connected one to another by cable connection using a general signal cable.

The camera power source circuit 21 has a configuration wherein in the event that the digital camera 10 performs operations as a single device, the camera power source circuit 21 serves as a power source for the digital camera 10. Accordingly, the camera power source 21 is electrically connected to a power line (not shown) of the circuit unit of the digital camera 10.

On the other hand, in the event that the present digital camera 10 and the printer 60 are connected one to another with the connection terminals 57 and 58, a printer power source circuit 55 (which will be described later) of the printer 60 is electrically connected to the camera power source circuit 21 of the present digital camera 10 through the connection terminals 57 and 58. The printer power source circuit 55 in this state serves as a power source for supplying electric power to the entire print system including both the devices of the digital camera 10 and the printer 60.

That is to say, in the event that the print system according to the present embodiment performs operations in the state wherein the digital camera 10 and the printer 60 are connected one to another, the electric power supplied from the printer power source circuit 55 is supplied to the camera power source circuit 21 through the connection terminals 57 and 58, thereby enabling the present print system to be perform operations. That is to say, the printer power source circuit 55 serves as a main power source of the print system according to the present embodiment, for supplying electric power to the digital camera 10, as well as serving as a power-supply circuit for charging the secondary battery 64.

Furthermore, in the event that the present digital camera 10 and the printer 60 are connected one to another with the connection terminals 57 and 58, the secondary battery 64 (see FIG. 2) included within the camera power source circuit 21 receives electric power from the printer power source circuit 55 through the connection terminals 57 and 58. Thus, with such a configuration, the printer power source circuit 55 can charge the secondary battery of the digital camera 10.

Next, description will be made regarding principal components included in an internal configuration of the printer 60 with reference to FIG. 1.

The printer 60 forming a part of the print system according to the present embodiment comprises the microcomputer 22 for centrally controlling the aforementioned printer 60 so as to perform the functions as an image formation device while communicating with the DSC controller 13 of the aforementioned digital camera 10, including a USB device controller 22a therein serving as image data receiving means for receiving the image data supplied from the digital camera 10 through the USB host controller 19 (image data transmission means), a paper tray 45 serving as paper-sheet loading means for holding multiple stacked printing paper sheets 46 to be supplied for printing operations, a paper tray detecting switch 44 for detecting whether or not the paper tray 45 is loaded at a predetermined portion in the present printer 60 in a sure manner, a transporting motor 49 such as a stepping motor or the like, serving as a driving source for performing transporting operation for moving the printing paper sheet 46 in a predetermined direction at a predetermined timing so as to feed the printing paper sheet 46 to a predetermined position within the present printer 60, a transporting motor driving circuit 50 for performing driving control for the transporting motor 49, and the like, according to instruction signals from the microcomputer 22, a grip roller 47, connected to the transporting motor 49, for transmitting rotational driving force from the transporting motor 49 to the printing paper sheet 46, a pinch roller 48 disposed at a position facing the grip roller 47 for holding the printing paper sheet 46 at the nip between the grip roller 47 and the pinch roller 48 so as to assist transporting operations for the printing paper sheet 46, a paper position sensor 51 formed of a device such as a photo reflector (PR) or the like for detecting the position of the printing paper sheet 46 in the direction of the movement of the printing paper sheet 46, a platen roller 52 for pressing the head face of the printing head unit (thermal head 38) into contact with the printing face of the printing paper sheet 46 with an ink ribbon 33 introduced therebetween, as well as assisting transporting operations for the printing paper sheet 46, a head positioning control motor 41 for controlling driving of a head arm 39 including the thermal head 38 upward and downward, a head motor driving circuit 42 for performing driving control for the head positioning control motor 41 according to instruction signals from the microcomputer 22, a cam 40 connected to the rotational shaft of the head positioning control motor 41 for transmitting the rotational driving force from the head positioning control motor 41 to the head arm 39 so as to reciprocally move the head arm 39 in the direction of the arrow X shown in FIG. 1, a head position sensor 43 which is a sensor formed of a device such as a photo interrupter (PI) or the like for detecting the rotational position of the cam 40 or the like for detecting the position of the thermal head 38, SRAM 24 serving as internal memory for temporarily storing the image data in a format for being used for printing operations, which is transmitted from the microcomputer 22 to the present printer 60 through the external bus line 23, a thermal head control circuit 25 for driving and controlling the thermal head 38, as well as reading out the image data temporarily stored in the SRAM 24 so as to output the image data to the thermal head 38, an ink ribbon casing 32 for storing the dye-coated ink ribbon 33, wound thereto, for performing desired print on the printing paper sheet 46, a ribbon position detector 36, which is a sensor formed of a device such as a photo reflector (PR) or the like, for detecting the position of each film of the ink ribbon 33 (Y, M, C, protective film; details of the ink ribbon 33 will be described later), a temperature sensor 37 formed of a device such as a thermistor or the like for measuring the temperature of the thermal head 38, a ribbon motor 30 serving as a driving source for performing the winding operation for the ink ribbon 33 such that the ink ribbon 33 is moved by a suitable distance at a predetermined timing, a ribbon motor driving circuit 31 for driving and controlling the ribbon motor 30 according to instruction signals from the microcomputer 22, a ribbon movement detector 35 formed of a device such as a photo interrupter (PI) or the like for detecting whether or not the winding operation for the ink ribbon 33 has been correctly performed, a slit disk 34 having a configuration for rotating according to the movement of the ink ribbon 33, a ribbon casing detecting switch 29 for detecting whether or not the ribbon casing 32 is loaded at a predetermined portion in the present printer 60 in a sure manner, a printer operation switches 54, disposed in a circuit unit (not shown) within the present printer 60, serving as a switching member for generating predetermined instruction signals or the like, which correspond to, and are generated according to multiple operation members for performing various kinds of settings, operations, or the like, for the printer 60, non-volatile memory 53 for storing various kinds of setting information or the like with regard to the present printer 60 beforehand, an AC adapter 59 serving as relay means for supplying electric power from an external power source to the present printer 60, a power terminal 56 serving as a terminal for connecting the AC adapter 59 to the present printer 60, a printer power source circuit 55 for receiving the electric power supplied from the AC adapter 59 through the power terminal 56, and converting the electric power into electric power with a voltage suitable for the circuit unit (not shown) of the present printer 60 so as to be supplied to the aforementioned circuit unit, a fan 26 for dissipating heat occurring within the present printer 60 during operations to the outside thereof, a fan motor 27 for rotationally driving the fan 26, a fan motor driving circuit 28 for driving and controlling the fan motor 27, and the like.

The microcomputer 22 receives the instruction signals, image data, and the like, transmitted from the digital camera 10 through the connection terminals 57 and 58, and controls printing operations or the like of the present printer 60 based thereupon. That is to say, the microcomputer 22 serves as printing means having functions for performing image printing based upon the image data supplied from the digital camera 10 through the USB host controller 19 (image data transmission means) thereof and the USB device controller 22a (image data receiving means) of the microcomputer 22 included in the present printer 60. Note that the printer 60 employed in the print system according to the present embodiment has a configuration wherein print operations cannot be performed with the printer 60 as a single device, but print operations can be performed in the state wherein the printer 60 is connected to the aforementioned digital camera 10.

Furthermore, the microcomputer 22 monitors various kinds of instruction signals and the like corresponding to multiple printer operation switches 54, and performs control for the driving circuit or the like corresponding to the operations performed by the user.

Here, the printer operation switches 54 are formed of multiple operation switches as described above, and include a print start switch for giving instructions for starting printing operations, a power switch for giving instructions for performing on/off switching of the power source of the present printer 60, and the like, for example.

The operation members for operating the printer operation switches 54 formed of these multiple switches are individually disposed at predetermined portions of a casing member (not shown) of the printer 60, and serve as operating means for the user performing operations in the state wherein the digital camera 10 and the printer 60 are connected one to another.

That is to say, the printer 60 has a configuration wherein, upon the user operating a desired operating member of the printer 60, the printer operation switches 54 generate corresponding instruction signals so that the microcomputer 22 performs corresponding control. Thus, the printer 60 performs printing operations for the user-desired image.

Furthermore, the microcomputer 22 performs control of the head positioning control motor 41 through the head motor driving circuit 42 based upon the output from the head position sensor 43, thereby determining the position of the thermal head 38.

Furthermore, the microcomputer 22 performs control of the transporting motor 49 through the transporting motor driving circuit 50 based upon the output from the paper position sensor 51, thereby determining the position of the print paper sheet 46 along the direction of movement of the print paper sheet 46.

The microcomputer 22 has a configuration wherein detection is made whether or not the winding operation for the ink ribbon 33 is being correctly performed, by monitoring the output from the ribbon movement detector 35.

That is to say, the microcomputer 22 detects the amount of rotation of the slit disk 34 by detecting the output from the ribbon movement detector 35 disposed at a position facing the slit disk 34 rotating according to movement of the ink ribbon 33, thereby monitoring winding operations for the ink ribbon 33.

The non-volatile memory 53 stores predetermined information and the like, which are to be stored, even in the event that electric power supply for the present printer 60 is turned off. Examples of the aforementioned information include control parameters for indicating history of control of the present printer 60, print parameters for indicating the properties of the present printer 60, and the like.

Accordingly, the non-volatile memory 53 is formed of a device such as EEPROM (Electrically Erasable Programmable Read-Only Memory) which is ROM that can be electrically rewritten, FeRAM (Ferroelectric Random Access Memory) which is ferroelectric memory, SRAM (Static Random Access Memory) with a backup battery, or the like.

The transporting motor 49 is a member forming a part of printing paper sheet transporting means for performing printing paper sheet transporting operations such as; paper feeding operations, which is transporting operation for preparation, wherein the printing paper sheet 46 is picked up (taken out) from the paper tray 45 (paper loading unit), and is moved (transported) up to a predetermined print start position, i.e., a position facing the thermal head 38 (printing head); paper-sheet transporting operations for moving the printing paper sheet 46 at a predetermined speed in a predetermined direction during printing operations, i.e., transporting operations for causing the change in the relative position between the printing paper sheet 46 and the thermal head 38 so as to perform predetermined printing operations by the thermal head 38; discharge operations for discharging the printing paper sheet 46 to the outside of the present printer 60 at the time of completion of the printing operations; and the like. Note that the printing paper sheet 46 is pinched at the nip between the grip roller 47 and the pinch roller 48 during transporting operations for the printing paper sheet 46, and thus, the printing paper sheet 46 is held without positional deviation in a sure manner.

Note that the printing paper sheet transporting means is formed of components such as the transporting motor 49, the transporting motor driving circuit 50, the grip roller 47, the pinch roller 48, and the like.

The grip roller 47 is driven by the transporting motor 49. The driving electric power for driving the transporting motor 49 is supplied from the transporting motor driving circuit 50. The microcomputer 22 can transport the printing paper sheet 46 at a desired timing by transmitting predetermined control signals to the transporting motor driving circuit 50.

The ink ribbon 33 stored in the ribbon casing 32 is formed of transfer films on which are coated dyes (Y (Yellow), M (Magenta), and C (Cyan)), which are to be transferred onto the printing paper sheet 46 under heat, a transfer film for forming a protective layer, and the like.

Each of the films (Y, M, C, and protective layer) of the ink ribbon 33 includes marks in a predetermined shape for being detected. The ribbon position detector 36 detects the position of each film of the ink ribbon 33 by detecting the aforementioned mark.

The printer power source circuit 55 can be connected to the AC adapter 59 through the power terminal 56 as described above, thereby receiving power supply from the external power source.

Furthermore, the printer power source circuit 55 is electrically connected to a power line (not shown) of the circuit unit within the present printer 60. Accordingly, the electric power from the external power source is supplied to the printer power source circuit 55 through the AC adapter 59 and the power terminal 56 so as to be converted to electric power with a predetermined voltage by the aforementioned printer power source circuit 55, following which the converted electric power is supplied to the circuit unit to be distributed.

Note that the SRAM 24 is formed of a semiconductor device (memory) for receiving the data transmitted from the digital camera 10 so as to be temporarily stored therein, as described later.

Furthermore, the SRAM 24 and the thermal head control circuit 25 are electrically connected to the microcomputer 22 through the external bus line 23.

Next, description will be made below in detail regarding a configuration of the connecting portion wherein the digital camera and the printer are connected one to another, and configurations of the power source circuits, each disposed within the aforementioned digital camera and printer, according to the present embodiment, with reference to FIG. 2.

With the print system according to the present embodiment, the connecting means for connecting the digital camera 10 and the printer 60, forming the aforementioned print system, one to another, comprises the connection terminal 57 provided to the digital camera 10, and the connection terminal 58 provided to the printer 60, as described above.

Each of the connection terminals 57 and 58 include six signal lines of Vbus, D+, D−, GND, CHG, and PGND, therein. Of these lines, four signal lines of Vbus, D+, D−, and GND, are required with the USB standards. In addition, the connecting means according to the present embodiment includes two lines of CHG and PGND. These two signal lines serve as lines for supplying electric power necessary for operations of the digital camera 10 to the digital camera 10 from the printer 60.

More specifically, the CHG is a line (first power supply line) for supplying electric power for operating the digital camera 10, and electric power for charging the secondary battery 64 of the digital camera 10, from the printer 60 to the digital camera 10. Accordingly, the CHG has a higher power capacity than with the aforementioned four signal lines (Vbus, D+, D−, and GND) stipulated by the USB standards. Accordingly, the PGND serving as a dedicated ground line other than the USB signal line is disposed, corresponding to the CHG having a high power capacity.

The normal USB standards has a configuration wherein electric power can be supplied to a device serving as a destination device from another device serving as a host device using the Vbus line serving as a second power supply line. On the other hand, the print system according to the present embodiment has a configuration wherein electric power is supplied from the printer 60 serving as a destination device to the digital camera 10 serving as a host device. Furthermore, the printer 60 has a configuration wherein the printer 60 can perform operations with electric power supplied from its own power source. That is to say, the present print system has a configuration wherein the Vbus is not used as a power supply line, but is used for forming a signal communication interface.

The digital camera 10 has a configuration wherein data exchange can be made between the DSC controller 13 and the sub-controller 63 through a serial communication line. Furthermore, the sub-controller 63 monitors the secondary battery 64 according to instruction signals from the DSC controller 13. That is to say, the sub-controller 63 serves as a battery monitoring circuit unit for detecting and monitoring the state of the secondary battery 64, and transmitting the detected data to the DSC controller 13.

A resistor R04 is a dummy load resistor used for measuring the battery voltage, and a current can be applied from the secondary battery 64 to the dummy load resistor through Q01. The voltage of the secondary battery 64 is measured with the dummy load resistor.

An IO port P_ContR of the sub-controller 63 is connected to Q01 such that on/off switching of Q01 can be controlled with the IO port P_ContR. Furthermore, resistors R6 and R5 are resistors for converting the voltage of the secondary battery 64 into a voltage within the input range of an AD converter 63a included within the sub-controller 63.

Furthermore, the digital camera 10 includes a temperature sensor 67 serving as means for measuring the temperature of the secondary battery 64 therein. The output from the temperature sensor 67 is input to the AD converter 63a of the sub-controller 63. The sub-controller 63 receives the output from the temperature sensor 67, thereby measuring the temperature of the secondary battery 64.

In the state wherein the digital camera 10 and the printer 60 are connected one to another, the electric power input through the CHG line of the connection terminals 57 and 58 is input to the secondary battery 64 through the constant current circuit 66. In this case, the sub-controller 63 controls on/off switching of the constant current circuit 66 through the IO port P_ContC. Thus, the secondary battery 64 is charged. That is to say, the camera power source circuit 21 of the digital camera 10 has functions of a charging circuit for receiving power supply from the printer 60, and charging the secondary battery 64 employed as a power source of the digital camera 10.

A DC/DC converter 65A of the digital camera 10 performs operations under control of the DSC controller 13, and converts the input electric power to electric power with a voltage required for the circuit unit within the digital camera 10, whereby the converted electric power is output. In the event that the digital camera 10 and the printer 60 are connected one to another, the DC/DC converter 65A converts the voltage input through the CHG lines of the connection terminals 57 and 58. On the other hand, in the event that the digital camera 10 and the printer 60 are not connected one to another, the DC/DC converter 65A converts the voltage of the electric power supplied from the secondary battery 64 which is a rechargeable battery included in the digital camera 10. Note that the secondary battery 64 serves as a power source in a case of the digital camera 10 performing operations as an independent device. Furthermore, one output of the DC/DC converter 65A is connected to Vbus of the connection terminal 57 of the digital camera 10 through a transistor Q00.

Furthermore, the DSC controller 13 can control on/off switching of the transistor Q00 by outputting control signals from P_ContVbus of the IO port.

On the other hand, the signal lines D+ and D− of the connection terminals 57 and 58 form differential signal lines. The USB controller 19 and the USB device controller 22a included within the microcomputer 22 perform transmission/reception of data using a pair of the signal lines D+ and D−. These signal lines D+ and D− are pulled down with resistors R00 and R01 on the side of the digital camera 10. Accordingly, in the state wherein the digital camera 10 and the printer 60 are not connected one to another, both the signal lines D+ and D− are a low level. On the other hand, the printer 60 notifies the USB host controller 19 of the data transfer speed by setting either of the signal lines D+ or D− to a high level on the side of the printer 60.

On the other hand, the output from the CHG is divided with resistors R02 and R03, following which the divided output is input to P_DetChg which is an IO port of the DSC controller 13. Thus, the DSC controller 13 can detect whether or not the digital camera 10 and the printer 60 are connected one to another by monitoring the IO port P_DetChg.

Figure 2:
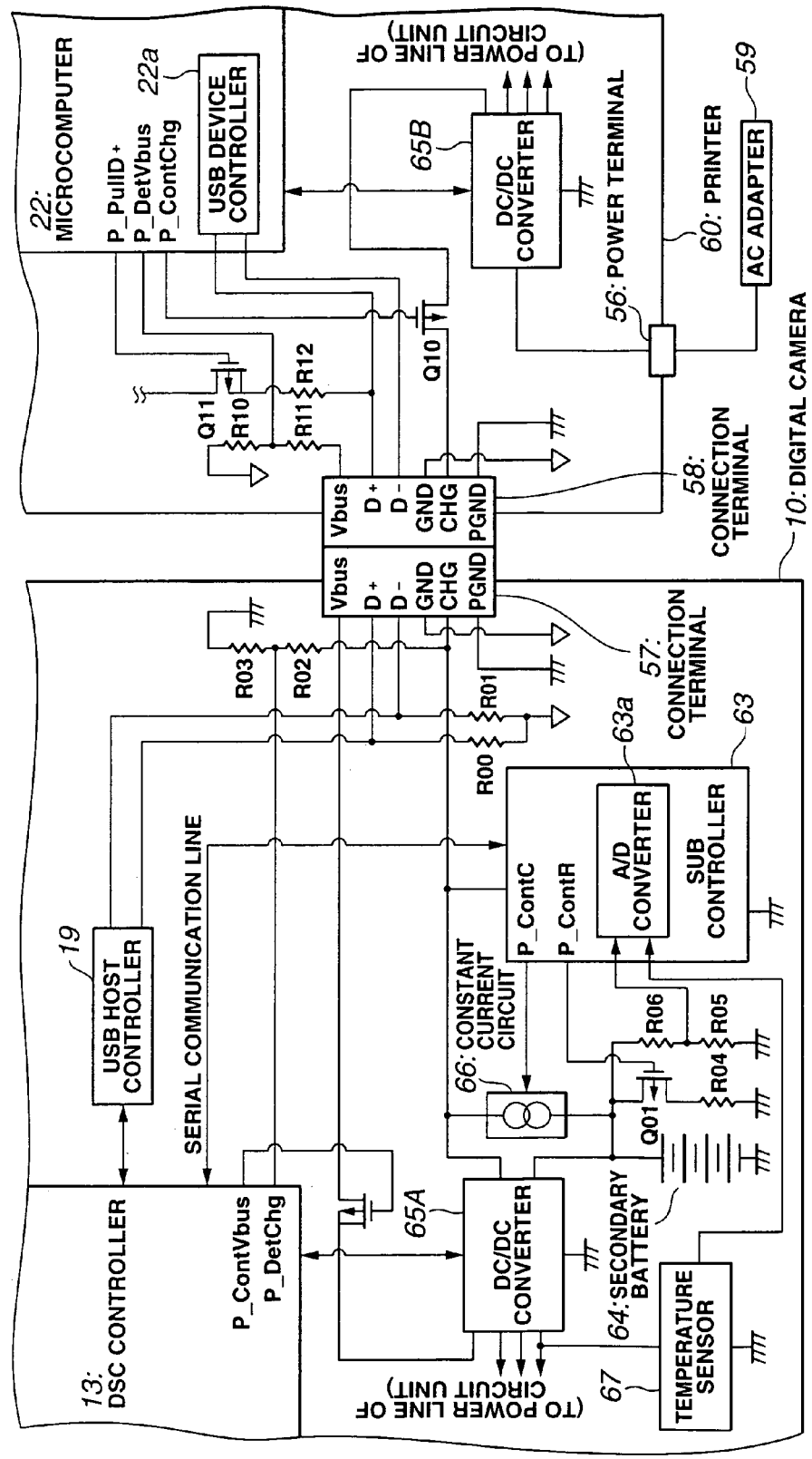
FIG. 2 is a schematic block diagram which shows a configuration of a connecting portion wherein the digital camera and the printer, forming the print system shown in FIG. 1, are connected one to another, and the internal configurations of power source circuit of both the devices.

On the other hand, the printer power source circuit 55 (see FIG. 1) of the printer 60 includes a DC/DC converter 65B, as shown in FIG. 2, having a configuration wherein the output supplied from the AC adapter 59 through the power terminal 56 is converted to electric power with a voltage required for the circuit unit included within the printer 60.

In this case, a part of the lines of DC/DC converter 65B of the printer power source circuit 55 is connected to CHG of the connection terminal 58 of the printer 60 through a transistor Q10. The transistor Q10 is connected to P_ContChg of the IO port of the microcomputer 22 so as to control on/off switching of the transistor Q10, thereby controlling supply of electric power to the digital camera 10.

The data transfer speed can be notified by pulling up either of the operation signal lines D+ or D−, and the print system according to the present embodiment has a configuration wherein communication can be made at full speed (12 Mbps). Accordingly, the signal line D+ is pulled up, and accordingly, the transistor Q11 and the resistor R12 are connected to the D+.

The transistor Q11 is connected to P_PullD+ of the IO port of the microcomputer 22 so as to control on/off switching thereof. As described above, pull-up of the D+ line is controlled by controlling on/off switching of the transistor Q11.

At the time of establishing (opening) a USB communication line, the DSC controller 13 sets the Vbus line from the low state to the high state. The level change can be obtained by monitoring P_DetVbus of the IO port of the microcomputer 22. Furthermore, in order to adapt the output level of Vbus to the input level of P_DetVbus of the IO port, resistors R10 and R11 are connected to the Vbus line.

Description will be made below regarding the operations of the print system having such a configuration according to the present embodiment with reference to flowcharts shown in FIG. 3, FIG. 4, and FIG. 5.

Note that the operations and processing performed by the DSC controller 13 of the digital camera and operations and processing performed by the microcomputer 22 of the printer are shown in the same drawings (FIG. 3 through FIG. 5), such that the operations while communicating or synchronizing with each other can be easily understood.

First, description will be made below regarding a main routine of the print system according to the present embodiment with reference to FIG. 3 through FIG. 5.

With the main routine of the print system, upon both the power source circuits 21 and 55, included in the digital camera 10 and the printer 60, respectively, being switched to on-state, a series of processing is started.

In this case, in the event that the digital camera 10 and the printer 60 are connected one to another, upon the user operating a predetermined operation member (not shown; which will be referred to as "printer main power source operation member" hereafter) for switching the on/off state of the printer power source circuit 55 of the printer 60, the printer power source circuit 55 is switched to the on-state. The printer power source circuit 55 has a configuration so as to perform operations while communicating with the camera power source circuit 21 of the digital camera 10 as described above, and accordingly, immediately following the printer power source circuit 55 being switched to the on-state, the camera power source circuit 21 is switched to the on-state, as well.

On the other hand, upon the user operating a predetermined operation member (not shown; which will be referred to as "camera main power source operation member" hereafter) for switching the on/off state of the camera power source circuit 21 of the digital camera 10, the camera power source circuit 21 is switched to the on-state.

Figure 3:
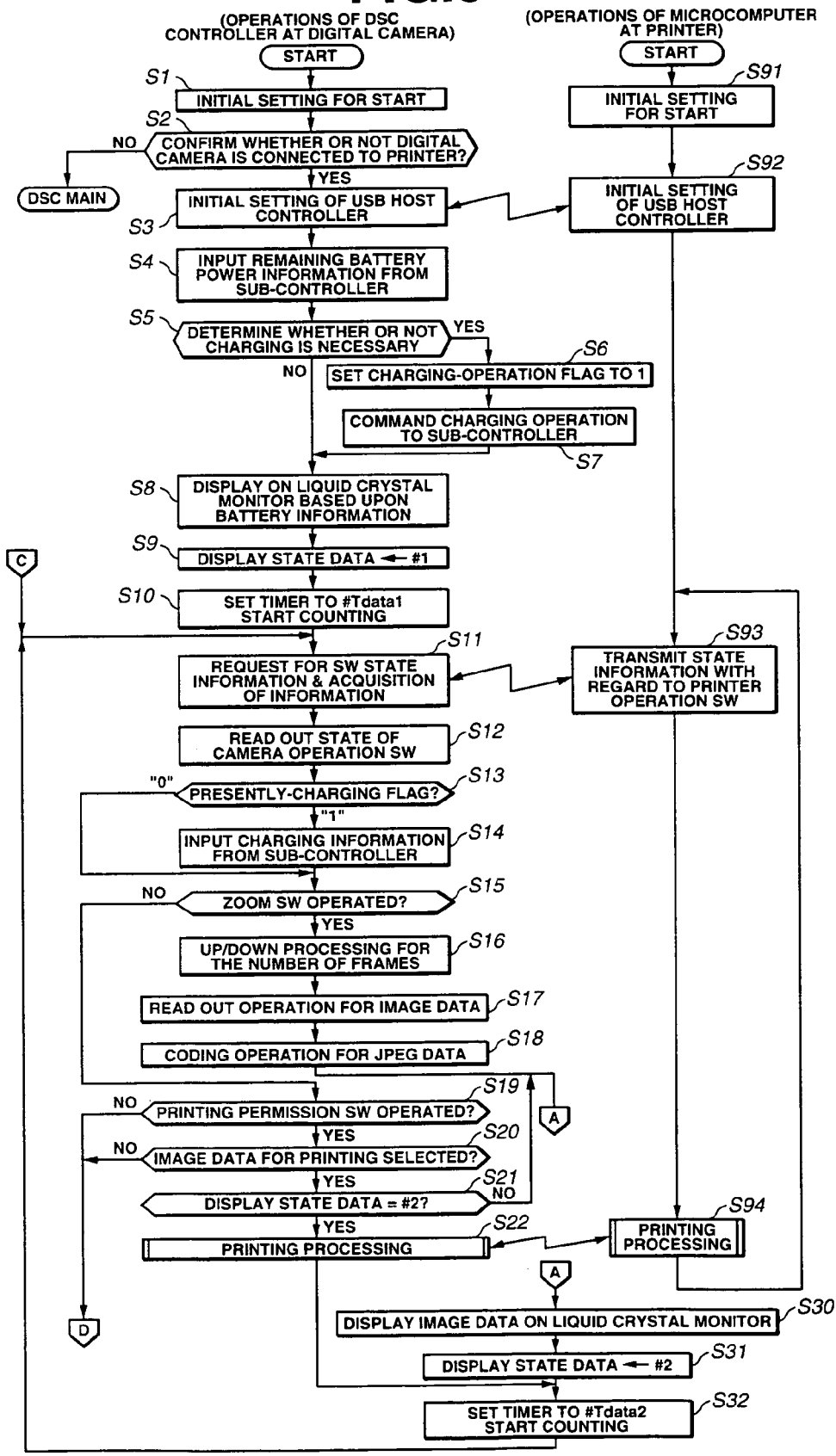
FIG. 3 is a flowchart which shows a part of the main routine for the present print system in the state wherein the digital camera and the printer, forming the print system shown in FIG. 1, are connected one to another.

Upon the camera power source circuit 21 of the digital camera 10 being thus switched to the on-state, the processing shown in Step S1 shown in FIG. 3 is performed under control of the DSC controller 13 on the side of the digital camera 10. In Step S1, initial settings for the start time of the digital camera 10, e.g., initializing of internal resistors of the controller, initializing of the IO port, initial setting of peripheral circuits, and the like, are performed. Subsequently, the flow proceeds to the processing shown in Step S2.

On the other hand, in a case of the digital camera 10 and the printer 60 being connected one to another, upon the printer power source circuit 55 is switched to the on-state by the user operating the printer main power source member, as well as the camera power source circuit 21 being switched to the on-state according to the aforementioned operation, first, electric power is supplied from the printer power source circuit 55 to the camera power source circuit 21 through the CHG line, following which the DSC controller 13 of the digital camera 10 starts up so as to perform the initial setting processing for the start of the digital camera 10 (above-described processing or the like) in Step S2. At the same time, the DSC controller 13 transmits predetermined instruction signals to the microcomputer 22 of the printer 60 so that the microcomputer 22 performs initial settings for the start of the printer 60 as shown in Step S91. Subsequently, while the printer 60 enters the waiting state, the flow proceeds to the next processing shown in Step S2 on the side of the digital camera 10.

In Step S2, the DSC controller 13 confirms whether or not the digital camera 10 and the printer 60 are connected one to another. In the event that the digital camera 10 and the printer 60 are connected one to another, the output from the CHG is divided with the resistors R02 and R03, following which the divided output is input to the P_DetChg of the IO port of the DSC controller 13. Thus, the P_DetChg of the IO port is set to the high level.

That is to say, in the processing shown in Step S2, the DSC controller 13 determines whether or not the digital camera 10 and the printer 60 are connected one to another by monitoring the input level of the P_DetChg of the IO port. In this case, in the event that the P_DetChg of the IO port at the high level is detected, determination is made that the digital camera 10 and the printer 60 are connected one to another, the flow proceeds to the next processing shown in Step S3, and processing is performed for configuring the printer system for performing operations in the processing following the Step S3, wherein the digital camera 10 and the printer 60 perform operations while communicating with each other.

Figure 14:
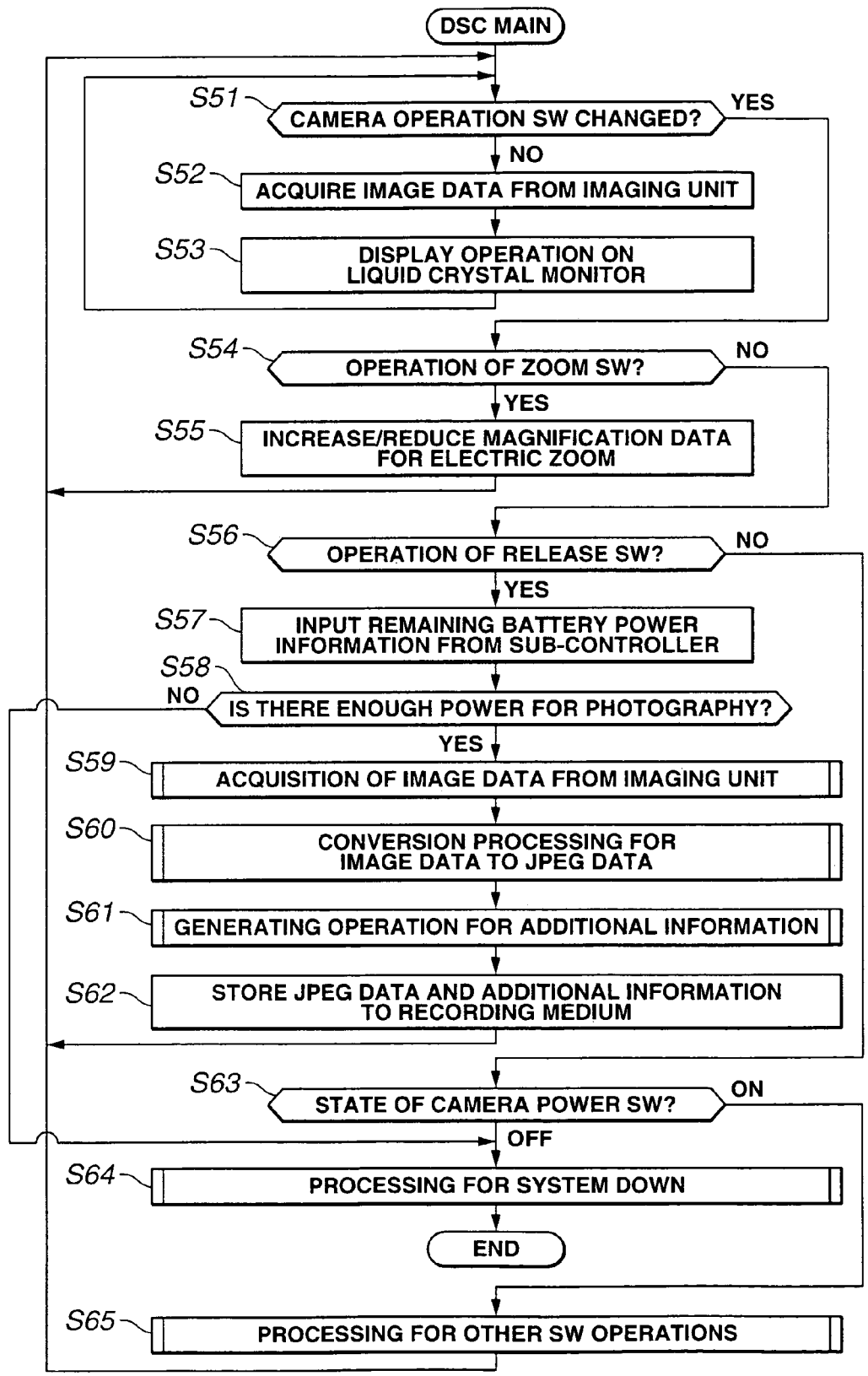
FIG. 14 is a flowchart which shows a sub-routine "DSC main" for operating the digital camera forming a part of the print system shown in FIG. 1, as a single camera.

On the other hand, in the event that the P_Detchg of the IO port at the low level is detected by the DSC controller 13 in the aforementioned Step S2, determination is made that the digital camera 10 and the printer 60 are not connected one to another, and the flow proceeds to the DSC main routine (see FIG. 14). This routine is a processing routine for operations of the digital camera 10 serving as a single image input device. Detailed description will be made later regarding the processing routine.

In the above-described processing shown in Step S2, in the event that determination is made that the digital camera 10 and the printer 60 are connected one to another, the printer system is formed wherein both the devices perform operations while communicating with each other, as described above. In order to perform such operations, there is the need to establish (open) a communication line between these devices.

Accordingly, in Step S3, the DSC controller 13 performs predetermined initial setting processing for the USB host controller 19. At the same time, the DSC controller 13 transmits predetermined instruction signals to the microcomputer 22 of the printer 60. Subsequently, the flow proceeds to the processing shown in Step S4.

On the other hand, the microcomputer 22 receives the predetermined instruction signals transmitted from the DSC controller 13 in the above-described processing shown in Step S3, and performs predetermined initial setting processing for the USB device controller 22a in Step S92. Subsequently, the printer 60 enters the waiting state.

Next, in Step S4, the DSC controller 13 requests the information with regard to the remaining battery power of the sub-controller 63, and obtains the information. In this case, upon the sub-controller 63 receiving a communication request with regard to the remaining-battery-power information from the DSC controller 13, the sub-controller 63 drives the dummy load so as to measure the voltage of the secondary battery 64 in this state, calculates the remaining battery power based upon the measurement results, and transmits the information with regard to the remaining battery power thus obtained to the DSC controller 13. Subsequently, the flow proceeds to the processing shown in Step S5. Note that the processing performed by the sub-controller 63 described above is the same as the processing shown in Step S302 described later (see FIG. 19).

Note that in this case, even in the event that the secondary battery 64 is not loaded in the digital camera 10, the electric circuit of the digital camera 10 performs operations as long as electric power is supplied to the electric circuit from the printer power circuit 55. In this case, the sub-controller 63 confirms whether or not the secondary battery 64 is loaded in the digital camera 10. In the event that confirmation is made that the secondary battery 64 is not loaded in the digital camera 10, information to that effect is transmitted to the DSC controller 13.

In Step S5, the DSC controller 13 confirms whether or not there is the need to charge the secondary battery 64, based upon the remaining-battery-power information obtained from the sub-controller 63. In the event that determination is made that there is the need to charge the secondary battery 64, the flow proceeds to the next processing shown in Step S6.

In Step S6, the DSC controller 13 sets a presently-charging flag to "1", following which the flow proceeds to the next processing shown in Step S7, and in Step S7, the DSC controller 13 transmits instruction signals for starting the charging operation to the sub-controller 63. Note that the presently-charging flag set in the above-described Step S6 is not cleared (is not reset to "0") until the charging operation is completed. The sub-controller 63 receives the instruction signals, and performs processing shown in Step S315 described later (see FIG. 20).

On the other hand, in the event that the DSC controller 13 determines that there is no need to charge the secondary battery 64, based upon the remaining-battery-power information obtained from the sub-controller 63 in the above-described Step S5, the flow proceeds to the next processing shown in Step S8.

In Step S8, the DSC controller 13 performs display processing for displaying the information with regard to the charging state of the secondary battery 64, or the like, using the liquid crystal monitor 15. Subsequently, the flow proceeds to the processing shown in Step S9.

Note that description will be made below regarding display examples for the information with regard to the charging state of the secondary battery 64 or the like, which is to be displayed on the liquid crystal monitor 15, with reference to FIG. 6 through FIG. 8.

Figure 6:
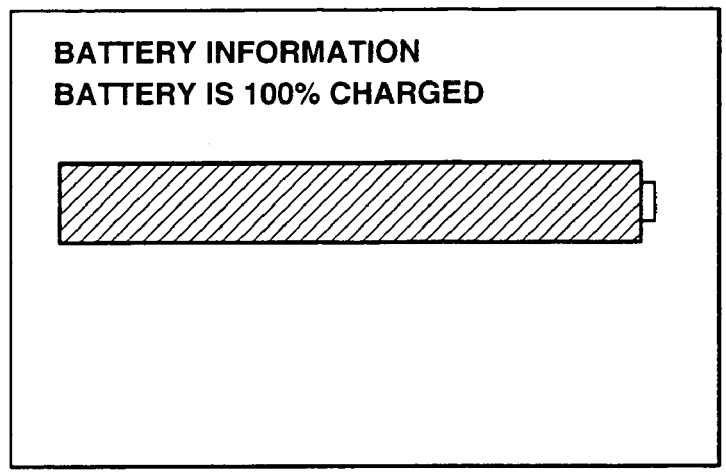

First, in the event that the battery has been already full charged (100% charged), according to the information obtained from the sub-controller 63, a display arrangement as shown in FIG. 6 is performed on the display unit of the liquid crystal monitor 15.

The display shown in FIG. 6 notifies that the secondary battery 64 has been fully charged, using the text information showing the details of the secondary battery 64, and a bar-graph image imitating the secondary battery 64. As described above, the information with regard to the charging state of the secondary battery 64 is displayed on the liquid crystal display monitor (which will be simply referred to as "liquid crystal monitor" hereafter) 15 with text information, image information, or the like, and thus, the user can easily confirm the information with regard to the secondary battery 64 from the liquid crystal monitor 15.

Figure 7:
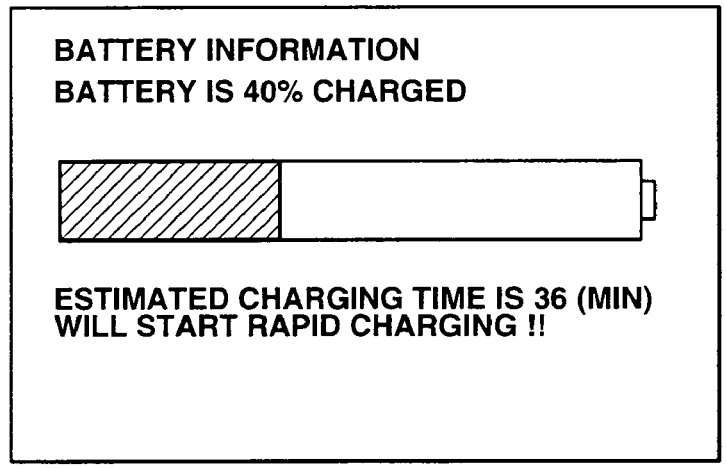

On the other hand, in the event that determination is made that the remaining battery power is less than 100%, based upon the information obtained from the sub-controller 63, a display arrangement shown in FIG. 7 is displayed on the display unit of the liquid crystal monitor 15, for example.

In the display arrangement shown in FIG. 7, a case wherein the remaining battery power is 40% of the full-charged-battery state, is shown as an example that the remaining battery power is less than 100%, for example, wherein the display arrangement is similar to that shown in FIG. 6. That is to say, in addition to the text information showing the details of the secondary battery 64, and a bar-graph image imitating the secondary battery 64, as shown in FIG. 6 described above, the estimated time requiring for the battery being full-charged in the event of performing the charging operation, or the like, is displayed, for example. Note that the estimated time up to completion of full-charging is an estimated value calculated by the sub-controller 63. Note that in the event that the remaining battery power of the secondary battery 64 is equal to or less than a predetermined level (e.g., 50% or less), further notification is made that a rapid charging operation has been started, using text information, as shown in FIG. 7.

Figure 8:
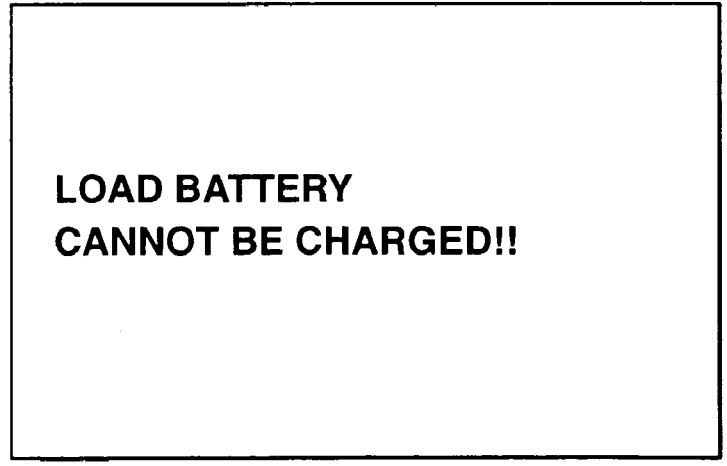

On the other hand, in the event that determination is made that the secondary battery 64 is not loaded in the digital camera 10, based upon the information obtained from the sub-controller 63, a display arrangement is displayed on the liquid crystal monitor 15, as shown in FIG. 8.

With the display arrangement shown in FIG. 8, a warning that the charging operation cannot be performed due to the secondary battery 64 not being loaded in the digital camera 10 is made using text information. Note that an arrangement may be made wherein an additional predetermined audio warning or the like is made by controlling the PCV 61, synchronously with the warning display on the liquid crystal monitor 15 shown in FIG. 8.

Following the processing shown in the above-described Step S8 being performed, i.e., predetermined display processing being performed by the liquid crystal monitor 15, as described above, the flow proceeds to the next Step S9, and the DSC controller 13 sets the display state data to "#1" in Step S9. Subsequently, the flow proceeds to the next processing shown in Step S10.

Here, the display state data indicates the display state of the liquid crystal monitor 15, and is assigned to a particular address of an internal memory (not shown) of the DSC controller 13 so as to be stored as appropriate.

Note the display state data of "#0" indicates that the liquid crystal monitor 15 performs no display operation, i.e., no information is displayed. For example, in the event that the user performs no operation during a predetermined period of time at the time of the power source of the digital camera 10 being on, the display state is switched to the aforementioned display state.

On the other hand, the display state data of "#1" indicates that the liquid crystal monitor 15 displays predetermined information with regard to the secondary battery 64.

Furthermore, the display state data of "#2" indicates that the liquid crystal monitor 15 displays an image corresponding to a predetermined image data selected by the user.

Next, in Step S10, the DSC controller 13 sets an internal timer (which will be referred to as "display timer" hereafter) for determining the display time for performing a predetermined display on the liquid crystal monitor 15, to "#Tdata1", and starts a counting operation. The value "#Tdata1" serves as a parameter which indicates display time (first time) for performing display of the information with regard to the secondary battery 64 or the like, on the liquid crystal monitor 15.

Here, in the event that the user performs operations using a predetermined operation member, the counting operation is temporarily stopped, and display on the liquid crystal monitor 15 is stopped by an interrupt instruction signal from the operation member. On the other hand, in the event that the user performs no operations until a predetermined setting time is elapsed, i.e., the count value set to the display timer reaches "#Tdata1" without occurrence of the predetermined interrupt signal, display on the liquid crystal monitor 15 is stopped at this time.

That is to say, the first time determined by the aforementioned "#Tdata1" serves as a predetermined value used for determining a timing at which the aforementioned display is turned off in the event that display for indicating the state of the secondary battery 64 is made on the liquid crystal monitor 15, and the user performs no operations for the digital camera 10.

Following the display on the liquid crystal monitor 15 being stopped as described above, the flow proceeds to the next processing shown in Step S11.

In Step S11, the DSC controller 13 transmits instructions (commands) for requesting the information with regard to the state of the printer operation switch 54 of the microcomputer 22, and obtains the information.

In this case, upon the microcomputer 22 in the waiting state receiving the instructions (instructions for requesting the information with regard to the state of the printer operation switch 54) from the DSC controller 13, the microcomputer 22 acquires the information with regard to the state of the printer operation switch 54, and transmits the information to the DSC controller 13, in Step S93.

Note that the signal transmission/reception operations between the DSC controller 13 and the microcomputer 22 are performed with a predetermined cycle using the interrupt transfer which is a kind of USB transfer format.

The DSC controller 13 receives and obtains the information with regard to the state of the printer operation switch 54 from the microcomputer 22 as described above, following which the flow proceeds to the next processing shown in Step S12.

In Step S12, the DSC controller 13 reads out the information with regard to the state of the camera operation switch 14. Subsequently, the flow proceeds to the processing shown in Step S13.

In Step 13, the DSC controller 13 makes determination whether or not charging operation is performed, by confirming the state of the presently-charging flag. That is to say, in the event that confirmation is made that the presently-charging flag is "0", determination is made that the charging operation is not performed, and the flow proceeds to the processing shown in Step S15.

On the other hand, in the event that confirmation is made that the presently-charging flag is "1", determination is made that the battery is charging, following which the flow proceeds to the next processing shown in Step S14, and the DSC controller 13 transmits instructions for requesting transmission of the information with regard to the charging state of the sub-controller 63 in Step S14. The sub-controller 63 transmits the information with regard to the present remaining battery power, the charging time, and the like, to the DSC controller 13 according to the request instructions. Thus, predetermined information with regard to the charging state is input to the DSC controller 13 from the sub-controller 63. Subsequently, the flow proceeds to the processing shown in Step S15.

As described above, the processing shown in the above-described Step S14 is periodically performed during the charging operation, and thus, the DSC controller 13 can always monitor the state of the secondary battery 64.

Subsequently, in Step S15, the DSC controller 13 confirms whether or not an operation member (not shown) synchronized with the zoom switch (ZoomSW) of the camera operation switch 14 has been operated. The zoom switch serves as an operation switch cooperating with the operation member for instructing processing for changing magnification of the image-taking optical system, at the time of the user operating the digital camera 10 as a single camera.

Furthermore, the zoom switch serves as another operation switch for instructing switching of a displayed image or the like at the time of displaying an image formed of image data stored in the recording medium 18 included in the digital camera 10 using the liquid crystal monitor 15, in the event that the digital camera 10 performs operations while communicating with the printer 60. That is to say, the user operates the predetermined operation member while observing the liquid crystal monitor 15, thereby performing switching of an image which is to be displayed on the liquid crystal monitor 15 according to instruction signals from the zoom switch cooperating with the operation member. Thus, a desired image can be easily displayed on the liquid crystal monitor 15.

In this Step S15, in the event that determination is made that the user operates the predetermined member, by confirming the instruction signals from the zoom switch (ZoomSW), the flow proceeds to the processing shown in Step S16. On the other hand, in the event that instruction signals are not confirmed from the zoom switch (ZoomSW), and accordingly, determination is made that the user does not perform the predetermined operation, the flow proceeds to the processing shown in Step S19.

In Step S16, the DSC controller 13 performs switching processing for an image which is to be displayed on the liquid crystal monitor 15 according to the instruction signals from the zoom switch. In this case, in the event that the instruction signal from the zoom switch instructs "upward direction", display switching is performed such that an image is displayed with a frame No. wherein a predetermined number is added (e.g., +1) to the frame No. of the image presently displayed on the monitor 15. On the other hand, in the event that the instruction signal from the zoom switch instructs "downward direction", display switching is performed such that an image is displayed with a frame No. wherein a predetermined number is subtracted (e.g., −1) from the frame No.

of the image presently displayed on the monitor 15. Subsequently, the flow proceeds to the processing shown in Step S17.

In Step S17, the DSC controller 13 reads out image data corresponding to the frame No. selected in the processing in the above-described Step S16 from the recording medium 18. Subsequently, the flow proceeds to the processing shown in Step S18.

In Step S18, the DSC controller 13 performs decoding processing for the image data (data in a compressed format, e.g., JPEG data or the like) read out in the above-described processing in Step S17. Subsequently, the flow proceeds to the processing shown in Step S30.

In Step S30, the DSC controller 13 performs processing for displaying an image corresponding to the image data, read out in the above-described processing in Step S17, and subjected to decoding processing in Step S18, on the liquid crystal monitor 15. Subsequently, the flow proceeds to the processing shown in Step S31.

In Step S31, the DSC controller 13 sets the display state data to "#2". Subsequently, the flow proceeds to the processing shown in Step S32. Note that the display state data of "#2" indicates that the liquid crystal monitor 15 displays the image corresponding to predetermined image data selected by the user, as described above.

Note that examples of the state for the liquid crystal monitor 15 prior to a new image being displayed on the liquid crystal monitor 15 in Step S30 described above, include:

a state wherein the liquid crystal monitor 15 displays no information (display state data of "#0"), a state wherein the liquid crystal monitor 15 displays information with regard to the secondary battery 64 (display state data of "#1"), a state wherein the liquid crystal monitor 15 displays the image selected by the user (display state data of "#2"), and so forth. In the above-described Step S30, a new selected image is displayed on the liquid crystal monitor 15, even in the event that the prior state of the liquid crystal monitor 15 is any of the aforementioned states. An image display arrangement displayed on the liquid crystal monitor 15 at the time of the processing in Step S30 being performed is shown in FIG. 9.

Figure 9:
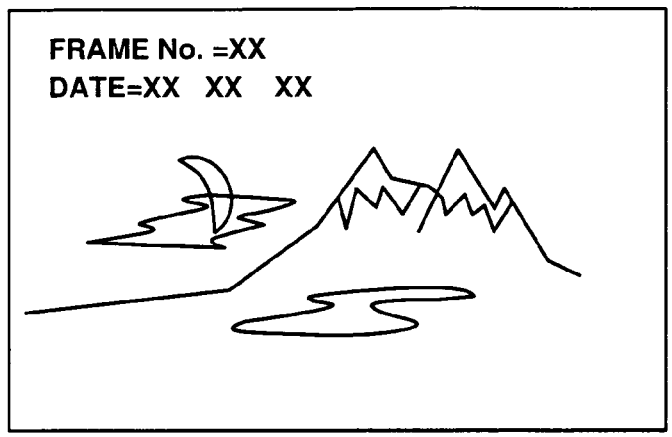
FIG. 9 is a diagram which illustrates a display example for an image formed based upon the image data acquired by the digital camera forming the print system shown in FIG. 1, and the accessory information thereof.

As shown in FIG. 9, with the display arrangement, the image corresponding to the selected image data is displayed on the entire display region of the liquid crystal monitor 15, and image accessory information such as frame No., date, and the like, included in the image data is displayed at predetermined positions with text information. In this case, the aforementioned image accessory information is superimposed on the image so as to be displayed, using the OSD (On-Screen Display) function, for example.

Subsequently, in Step S32, the DSC controller 13 sets the display timer to "Tdata2", and starts counting operation. The value "#Tdata2" serves as a parameter indicating display time (second time) for displaying the image on the liquid crystal monitor 15.

In this case, in the event that the user does not perform operations for the predetermined operation member until a predetermined period of time set to the display timer elapses, i.e., in the event that the count value set to the display timer reaches "#Tdata2" without occurrence of a predetermined interrupt signals, the display on the liquid crystal monitor 15 is stopped at this time.

That is to say, the second time set for the aforementioned "Tdata2" is a predetermined restricting period in time serving as a condition for determining that the display is off, in the event that the user performs no operations for the digital camera 10 at the time of an image which is to be printed, or which is a candidate image to be printed, being displayed on the display unit of the liquid crystal monitor 15 of the digital camera 10.

In the event that the display on the liquid crystal monitor 15 is stopped as described above, the flow returns to the above-described processing shown in Step S11, and the following processing is repeated.

On the other hand, in the event that the instruction signals from the zoom switch is not confirmed in the above-described processing in Step S15, and the flow proceeds to the processing shown in Step S19, the DSC controller 13 confirms the state of the print permission switch (SW) in Step S19. The state of the print permission switch is included in the information with regard to the state of the printer operation switch 54 obtained from the microcomputer 22 of the printer 60 in the above-described processing in Step S11. In the event that confirmation is made that instruction signals have been generated from the print permission switch, the flow proceeds to the next processing shown in Step S20. On the other hand, in the event that confirmation is made that the instruction signals have not been generated from the print permission switch, the flow proceeds to the processing in Step S23 shown in FIG. 4.

In the event that confirmation is made that the instruction signals have been generated from the print permission switch, in the above-described processing in Step S19, and the flow proceeds to the processing in Step S20, the DSC controller 13 confirms whether or not a user-desired image which is to be printed has been selected, in Step S20. In the event that the image which is to be printed has not been selected, the printer cannot perform printing operations. Accordingly, in that case, the flow proceeds to the processing in Step S23 shown in FIG. 4. Such a situation occurs due to the user operating a predetermined operation member synchronously operating with the print permission switch without performing selection operations for a desired image data which is to be printed, for example.

On the other hand, in the event that confirmation is made that a desired image which is to be printed has been selected, in the above-described processing in Step S20, the flow proceeds to the next processing in Step S21.

In Step S21, the DSC controller 13 confirms whether or not the display state data has been set to "#2". In the. event that the display state data has been set to "#2", the liquid crystal monitor 15 is in the state wherein a desired image which is to be printed, i.e., an image corresponding to selected image data, is displayed. In this case, the flow proceeds to the next printing processing in Step S22. Note that the printing processing in Step 22 is performed while communicating with the microcomputer 22 of the printer 60, and the microcomputer 22 performs processing in Step S94 at the same time. Details of the printing processing performed in Step S22 and Step S94 will be described later (see FIG. 15 through FIG. 18).

Upon the processing in Step S22 ending, the flow proceeds to the above-described processing in Step S32.

On the other hand, in the event that confirmation is made that the display state data has not been set to "#2", in the above-described Step S21, printing operations are forbidden, and the flow proceeds to the above-described processing in Step S30. Here, in the event that the display state data has been set to "#0", the liquid crystal monitor 15 displays no information. On the other hand, in the event that the display state data has been set to "#1", the liquid crystal monitor 15 displays information with regard to the secondary battery 64. In such a situation, printing operations are forbidden. The reason is that printing operations are preferably performed following the user observing the liquid crystal monitor 15 so as to confirm whether or not an image corresponding to a user-desired image data which is to be printed, or an image which is to be printed, is displayed. Accordingly, in this case (in a case wherein the display state data is other than "#2"), the instruction signals generated by the print permission switch are canceled, the flow proceeds to the above-described processing in Step S30, and a series of processing is performed wherein an image corresponding to desired image data which is to be printed is displayed on the liquid crystal monitor 15 in the following processing (S30), the display state data is set to "#2" (S31), and the display timer is set to "#Tdata2", and counting operation is started (S32), whereby the system enters the state wherein printing operation can be performed.

Figure 4:
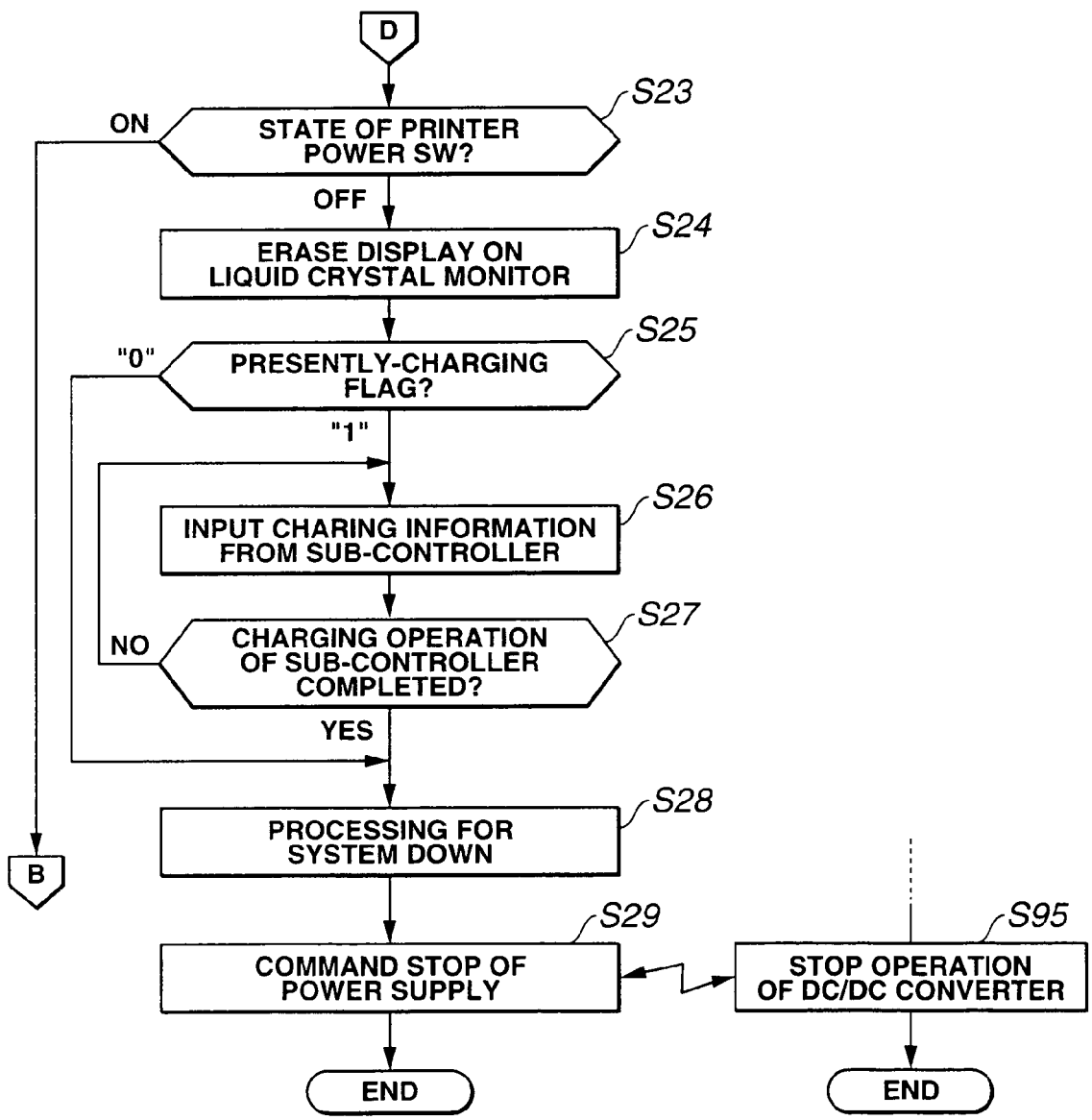
FIG. 4 is a flowchart which shows a part of the main routine for the present print system in the state wherein the digital camera and the printer, forming the print system shown in FIG. 1, are connected one to another.

In the event that confirmation is made that the instruction signals have not been generated by the print permission switch in the above-described processing in Step S19, and confirmation is made that image data has not been selected in the above-described processing in Step S20, and the flow proceeds to the processing in Step S23 shown in FIG. 4, the DSC controller 13 confirms the state of the printer power source switch (SW) in Step S23. The state of the printer power source switch is included in the information with regard to the state of the printer operation switch 54 obtained from the microcomputer 22 of the printer 60 in the above-described processing in Step S11.

Figure 5:
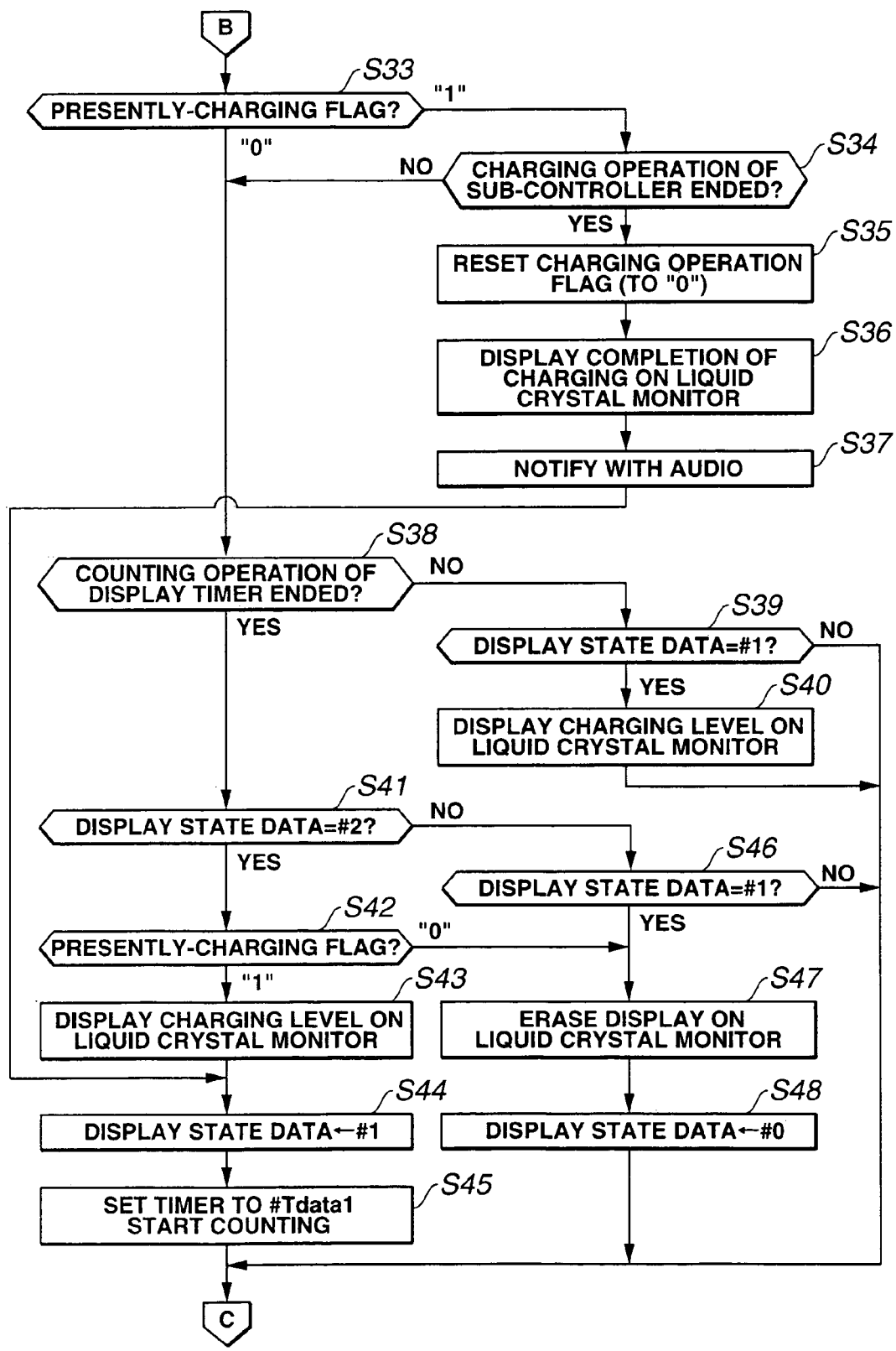
FIG. 5 is a flowchart which shows a part of the main routine for the present print system in the state wherein the digital camera and the printer, forming the print system shown in FIG. 1, are connected one to another.

In the event that confirmation is made that the instruction signals have been generated by the printer power source switch, and determination is made that the printer power source is on-state, the flow proceeds to the processing in Step S33 shown in FIG. 5. On the other hand, in the event that confirmation is made that the instruction signals have not been generated by the printer power source switch, and determination is made that the printer power source is in an off state, the flow proceeds to the next processing shown in Step S24.

In Step S24, the DSC controller 13 performs processing for stopping the display on the liquid crystal monitor 15. Subsequently, the flow proceeds to the processing shown in Step S25.

In Step S25, the DSC controller 13 confirms the state of the presently-charging flag. In this case, in the event that the presently-charging flag has been set to "0", determination is made that the charging operation has been completed, and the flow proceeds to the processing shown in Step S28. On the other hand, in the event that the presently-charging flag has been set to "1", determination is made that the charging operation has not been completed (non-completion state), and the flow proceeds to the next processing shown in Step S26.

In Step S26, the DSC controller 13 communicates with the sub-controller 63 so as to obtain predetermined information with regard to the charging state from the sub-controller 63. Subsequently, the flow proceeds to the processing shown in Step S27.

In Step S27, the DSC controller 13 enters the waiting state until the DSC controller 13 receives the notification of completion of the charging operation from the sub-controller 63. In the event that the DSC controller 13 receives the notification of completion of the charging operation from the sub-controller 63, the flow proceeds to the next processing shown in Step S28.

In this case, in the event that the user performs operations for the power switch of the printer 60, i.e., operation for turning off the power of the present print system, and the charging operation for the secondary battery 64 has not been completed, the power of the present print system should not be turned off, and there is the need to continue the charging operation.

Accordingly, in the processing in Step S26 through Step S27, the DSC controller 13 communicates with the sub-controller 63, and forms a processing routine for waiting until the DSC controller 13 receives the notification of completion of the charging operation from the sub-controller 63.

Subsequently, in Step S28, the DSC controller 13 performs predetermined processing (system down processing) for stopping the system. Subsequently, the flow proceeds to the processing shown in Step S29.

In Step S29, the DSC controller 13 transmits a command for stopping power supply, to the microcomputer 22. As a result, the microcomputer 22 stops the operations of the DC/DC converter 65B of the printer power source circuit 55 in the processing in Step 595 shown in FIG. 4. Thus, the printer 60 stops operations thereof, and a series of processing routines ends (END). Furthermore, supply of electric power from the printer 60 is stopped, and accordingly, the digital camera 10 stops the operations thereof, as well. Thus, a series of the processing routine ends (END).

On the other hand, in the event that determination is made that the printer power is on-state in the above-described processing in Step S23, and the flow proceeds to the processing in Step S33 in FIG. 5, the DSC controller 13 confirms the state of the presently-charging flag in Step S33. In this case, in the event that the presently-charging flag has been set to "1", determination is made that the charging operation has not been completed (non-completion state), and the flow proceeds to the processing in Step S34. On the other hand, in the event that the presently-charging flag has been set to "0", determination is made that the charging operation has been completed, and the flow proceeds to the processing in Step S38.

In Step S34, the DSC controller 13 confirms the information with regard to the charging state obtained in the above-described processing in Step S14, and confirms whether or not the charging operation has been completed. Here, confirmation is made that the charging operation has been completed, the flow proceeds to the next processing shown in Step S35. On the other hand, in the event that confirmation is made that the charging operation has not been completed and that the battery is being charged, the flow proceeds to the processing shown in Step S38.

In Step S35, the DSC controller 13 resets the presently-charging flag (set to "0"). Subsequently, the flow proceeds to the processing shown in Step S36.

Figure 10:
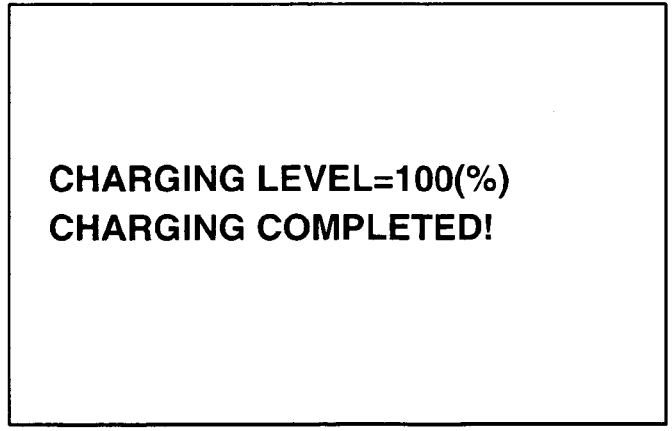

In Step S36, the DSC controller 13 displays for notifying completion of charging, using the liquid crystal monitor 15. Subsequently, the flow proceeds to the processing shown in Step S37. A display arrangement for notifying completion of charging in this case is shown in FIG. 10.

In Step S37, the DSC controller 13 controls the PCV 61 so as to give the user an audio notification that charging has been completed. Subsequently, the flow proceeds to the processing shown in Step S44.

The display operation for notifying completion of charging, performed in the above-described processing in Step S36, is performed during a period of time which has been set beforehand, and following the set time elapsing, the liquid crystal monitor 15 is stopped. Furthermore, the display for notifying completion of charging is performed with a higher priority than with other display operations. Accordingly, display of the notification (display of a notification of completion of charging) is performed, immediately following completion of the charging operation, regardless of the display state of the liquid crystal monitor 15. Accordingly, the above-described processing shown in Step S33 through Step S37 is periodically repeated.

On the other hand, in the event that confirmation is made that the presently-charging flag has been set to "0", in the above-described processing shown in Step S33, and accordingly, determination is made that the charging operation has been completed, and the flow proceeds to the processing shown in Step S38, the DSC controller 13 confirms whether or not the counting operation for the display timer has been completed, in Step S38. In the event that the counting operation for the display timer is being performed, the flow proceeds to the processing shown in Step S39. On the other hand, in the event that the counting operation for the display timer has been completed, the flow proceeds to the next processing shown in Step S41.

In Step S39, the DSC controller 13 confirms whether or not the display state data has been set to "#1". In this case, in the event that confirmation is made that the display state data has been set to "#1", the flow proceeds to the next processing shown in Step S40.

Next, in Step S40, the DSC controller 13 drives the liquid crystal monitor 15 so as to perform display of information with regard to the charging level based upon the latest information with regard to the charging state (information obtained in the above-described processing in Step S14). Subsequently, the flow returns to the above-described processing shown in Step S11, and the following processing is repeated. A display arrangement for notifying the information with regard to the charging level, performed in the aforementioned Step, is shown in FIG. 11.

Figure 11:
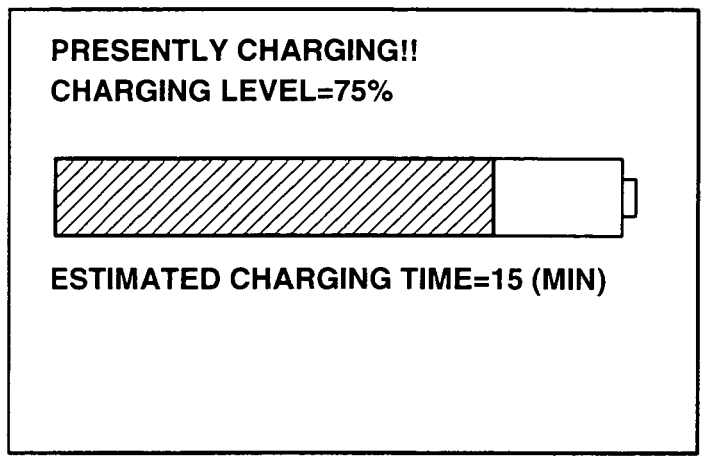

As shown in FIG. 11, the display arrangement for notifying the charging level has a thought-out layout formed of text information and a bar-graph representing the secondary battery 64, so that the user can easily and visually confirm the present charging state such as the present charging level, the charging time required for full-charged battery power, or the like. The numerical information of the aforementioned information is updated based upon the latest information as appropriate, and the graphic information is changed as time passes.

On the other hand, in the above-described processing shown in Step S39, in the event that the display state data has not been set to "#1", the flow returns to the above-described processing in Step S11, and the following processing is repeated.

On the other hand, in the event that confirmation is made that the counting operation for the display timer has been completed, in the above-described processing in Step S38, and the flow proceeds to the next processing shown in Step S41, the DSC controller 13 confirms whether or not the display state data has been set to "#2", in Step S41. In the event that confirmation is made that the display state data has been set to "#2", the flow proceeds to the next processing shown in Step S42. On the other hand, in the event that the display state data has not been set to "#2", the flow proceeds to the processing shown in step S46.

In Step S46, the DSC controller 13 confirms whether or not the display state data has been set to "#1". In the event that confirmation is made that the display state data has been set to "#1", the liquid crystal monitor 15 displays the charging level shown in FIG. 11, or displays the notification of completion of charging shown in FIG. 10. Furthermore, the display state data of "#1" indicates that the user has not performed predetermined operations during a predetermined period of time (#Tdata1) set beforehand. In this case, the display operation of the liquid crystal monitor 15 needs to be stopped. Accordingly, the flow proceeds to the next processing shown in Step S47, and the DSC controller 13 performs processing for stopping the display operation of the liquid crystal monitor 15 in the Step S47. Subsequently, the flow proceeds to the processing shown in Step S48. Note that in the event that processing is performed for stopping the display operation of the liquid crystal monitor 15, the other circuits of the digital camera 10, predetermined circuits in the circuit block of the DSC controller 13, and the like, are preferably stopped, as well, synchronously with the aforementioned stopping operation. Such an operation has the advantage of suppressing power consumption in the waiting state of the present print system.

Next, in Step S48, the DSC controller 13 sets the display state data to "#0". Subsequently, the flow returns to the above-described processing shown in Step S11, and the following processing is repeated.

On the other hand, in the above Step S46, in the event that the display state data has not been set to "#1", the aforementioned display state data has been set to "#0". Accordingly, in this case, the liquid crystal monitor 15 performs no operation, and accordingly, the flow returns to the above-described processing in Step S11, and the following processing is repeated.

On the other hand, in the event that confirmation is made that the display state data has been set to "#2", in the aforementioned Step S41, and the flow proceeds to the processing shown in Step S42, the DSC controller 13 confirms the state of the presently-charging flag in the Step S42. In this case, in the event that the presently-charging flag has been set to "1", determination is made that the charging operation has not been completed (non-completion state), and the flow proceeds to the processing shown in Step S43. On the other hand, in the event that the presently-charging flag has been set to "0", determination is made that the charging operation has been completed, and the flow proceeds to the processing shown in Step S47.

As described above, the DSC controller 13 stops the display operation of the liquid crystal monitor 15 in Step S47, and sets the display state data to "#0" in the next Step S48, following which the flow returns to the above-described processing in Step S11, and the following processing is repeated.

That is to say, in the event that the display state data has been set to "#2" at the time of completion of the counting operation of the display timer (Step S41), the liquid crystal monitor 15 displays an image based upon a predetermined image data selected by the user (see FIG. 9), there is the need to stop the image-display operation. The display on the liquid crystal monitor 15 following the image-display operation depends on whether or not the battery is charging at the point of time. Accordingly, the presently-charging flag is confirmed in the aforementioned Step S42.

In the event that the presently-charging flag has been set to "1" in Step S42, as described above, the flow proceeds to the processing shown in Step S43, and the DSC controller 13 performs switching operation from the image (see FIG. 9) displayed on the liquid crystal monitor 15, to the display for notifying the charging level (see FIG. 11). Subsequently, the flow proceeds to the processing shown in Step S44.

In Step S44, the DSC controller 13 sets the display state data from "#2" to "#1", following which the flow proceeds to the processing shown in Step S45.

In Step S45, the DSC controller 13 sets the display timer to "#Tdata1", and starts counting operation. Subsequently, the flow returns to the above-described processing in Step S11, and the following processing is repeated.

On the other hand, in the above-described Step S42, in the event that the presently-charging flag has been set to "0", the flow proceeds to the processing shown in Step S47, as described above, and the DSC controller 13 performs processing for stopping the display on the liquid crystal monitor 15 in Step S47. Subsequently, the DSC controller 13 sets the display state data to "#0" in the next Step S48, following which the flow returns to the above-described processing in Step S11, and the following processing is repeated.

Specific description will be made below regarding the operations performed in the above-described Step S42 through Step S48. That is to say, in the event that confirmation is made that the battery is charging in the above-described processing in Step S42 (confirmation of the charging operation), and the image display as shown in FIG. 9 is performed on the liquid crystal monitor 15, and furthermore, the user has not performed predetermined operations during a predetermined period of time (#Tdata2) set beforehand, following the predetermined period of time elapsing, the display is switched to the display for notifying the charging level shown in FIG. 11 (Step S43).

On the other hand, in the event that confirmation is made that the charging operation has been completed in the above-described processing in Step S42 (confirmation of the charging state), and the image display as shown in FIG. 9 is performed on the liquid crystal monitor 15, and furthermore, the user has not performed predetermined operations during a predetermined period of time (#Tdata2) set beforehand, following the predetermined period of time elapsing, the display operation of the liquid crystal monitor 15 is stopped (Step S47).

Thus, the main routine of the present print system is performed.

On the other hand, in general, a relatively small-sized liquid crystal monitor is employed in a digital camera. Accordingly, in the event that various kinds of information are displayed on a single screen, the display becomes extremely cluttered, often leading to a problem that it is difficult for the user to confirm the various kinds of information.

Accordingly, with the above-described embodiment, in the event that an image is displayed on the liquid crystal monitor 15, only the corresponding image and the image information corresponding to the image are displayed, as shown in FIG. 9, and on the other hand, in the event that the charge level is displayed, only the charging level and the corresponding information with regard to the charging state are displayed, as shown in FIG. 11.

As another display arrangement other than the aforementioned display arrangement, an arrangement may be made wherein various kinds of information and the like are displayed on a single screen, while giving consideration to visual recognition of the various kinds of information on the screen.

Figure 12:
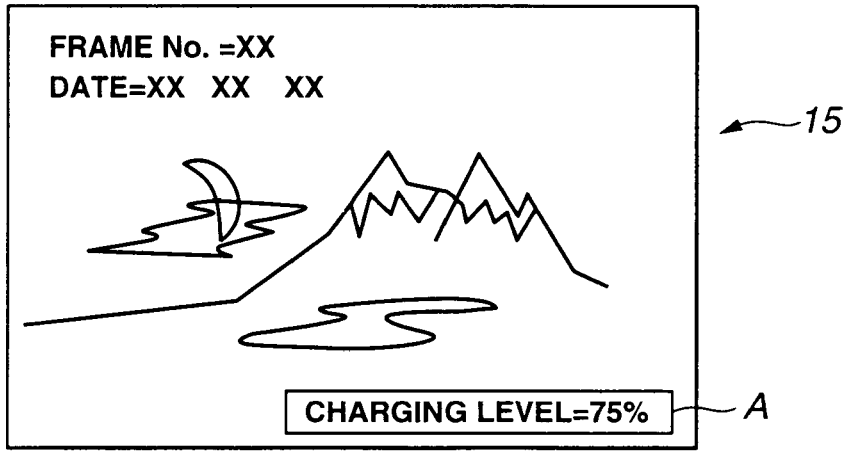
FIG. 12 is another diagram which illustrates a display example for an image formed based upon the image data acquired by the digital camera forming the print system shown in FIG. 1, and the accessory information thereof.

For example, another display arrangement example using the liquid crystal monitor of the digital camera of the print system according to the present embodiment is shown in FIG. 12.

In the example shown in FIG. 12, in the event that the secondary battery 64 of the digital camera 10 is charging at the time of an image corresponding to image data selected by the user being displayed on the liquid crystal monitor 15 of the digital camera 10, the information with regard to the charging level is displayed using a part of the display region of the liquid crystal monitor 15.

That is to say, with the example shown in FIG. 12, an image which is to be printed, or which is a candidate to be printed, is displayed with a relatively large size, and the display for notifying the state of the secondary battery 64 is displayed with a relatively small size, on the same screen. Note that with the present embodiment, the display arrangement as shown in FIG. 12 will be referred to as "first display arrangement" hereafter.

Specifically, in the same way as with the aforementioned example shown in FIG. 9, an image corresponding to the image data selected by the user is displayed on the entire display region on the liquid crystal monitor 15, the text information or the like for notifying the image accessory information included in the image data is displayed, and furthermore, the text information for notifying the information with regard to the charging level is displayed on a part (region denoted by the reference character A) of the display region. In this case, the image accessory information and the information with regard to the charging level are superimposed on the image using the OSD (On-Screen Display) function or the like.

The image display on the liquid crystal monitor 15 is made for the user visually confirming the image based upon the image data selected by the user, and accordingly, the information with regard to the charging level or the like displayed at the same time in addition to the image display as shown in FIG. 12 is nothing but accessory information. Accordingly, in this case, the region A for displaying the information with regard to the charging level should not be displayed with an excessively large size as to the image displayed on the liquid crystal monitor 15.

Note that with the print system having a configuration wherein the display arrangement shown in FIG. 12 is performed in Step S30 shown in FIG. 3 instead of the display arrangement shown in FIG. 9, such a display arrangement can be easily performed.

Figure 13:
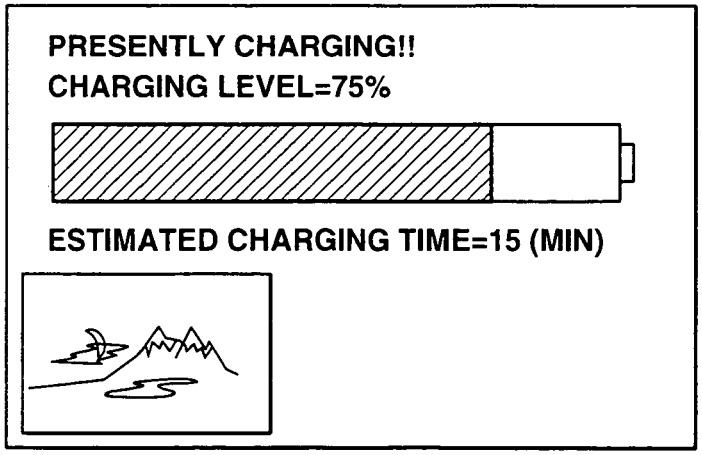

Furthermore, another display arrangement using the liquid crystal monitor of the digital camera of the print system according to the present embodiment for notifying the charging level is shown in FIG. 13.

In the example shown in FIG. 13, in the event that an image data selected by the user exists at the time of a display arrangement for the charging level being displayed on the liquid crystal monitor 15 of the digital camera 10 for notifying that the battery is charging, image display is performed using a part of the display region of the liquid crystal monitor 15.

That is to say, in the example shown in FIG. 13, the display for notifying the state of the secondary battery 64 is performed with a relatively large size, and an image which is to be printed, or which is a candidate to be printed, is displayed with a relatively small size, on the same screen on the display unit of the liquid crystal monitor 15 of the digital camera 10. Note that with the present embodiment, the display arrangement as shown in FIG. 13 will be referred to as "second display arrangement" hereafter.

Specifically, the display for notifying the charging level is performed using the entire display region on the liquid crystal monitor 15 in the same way as with the above-described example shown in FIG. 11, and in addition thereto, a reduced image corresponding to the image data selected by the user is displayed on a part (region denoted by the reference character B) of the display region. The reduced image can be easily formed by performing predetermined signal processing for the image data so as to generate a temporary image data with a reduced size, or the like. Furthermore, as another operation example, an arrangement may be made wherein an image data for displaying a thumbnail image included in the original image data is used as the aforementioned reduced image.

The display on the liquid crystal monitor 15 for notifying the charging level is performed for the user visually confirming the information with regard to the charging operation, and accordingly, the image displayed at the same time in addition to the aforementioned display for notifying the charging level is nothing but accessory information, as shown in FIG. 13. Accordingly, in this case, the region B for displaying the reduced image should not be displayed with an excessively large size as to the display region for notifying the charging level on the liquid crystal monitor 15, in the same way as with the above-described example shown in FIG. 12.

Note that with the print system having a configuration wherein the display arrangement shown in FIG. 13 is performed in Step S40 and Step S43 shown in FIG. 5 instead of the display arrangement shown in FIG. 11, such a display arrangement can be easily performed.

On the other hand, with the above-described embodiment, the DSC controller 13 performs switching operation between two kinds of display arrangements of the image display and the charging-level display (first display arrangement and second display arrangement) performed using the liquid crystal monitor 15, based upon a predetermined display period in time. Furthermore, an arrangement may be made wherein switching operation is performed between the first display arrangement and the second display arrangement at another time, e.g., at a user-desired timing by the user operating predetermined operations. In this case, an operation member having no relation with printing operations should be assigned to the operation member for the user performing display switching operation.

Specifically, for example, while a release operation member of the digital camera 10 serves as an operation member for the user performing operations at the time of taking an image in the operational state wherein image-taking operation can be performed, in general, the release operation member is not used at the time of printing operations. Accordingly, an arrangement may be made wherein the release operation member is used as a display-switching operation member.

That is to say, in the event that the charging level is displayed on the liquid crystal monitor 15, upon the user operating the release operation member at a desired time, predetermined instruction signals are generated from the predetermined release switch (SW) synchronously operating with the release operation member, the DSC controller 13 receives the instruction signals, and drives and controls the liquid crystal monitor 15 such that switching is performed from the charging-level display, which is the present display, to the image display.

On the other hand, in the event that an image is displayed on the liquid crystal monitor 15, upon the user operating the release operation member at a desired timing, predetermined instruction signals are generated from the predetermined release switch (SW) cooperating with the release operation member, the DSC controller 13 receives the instruction signals, and drives and controls the liquid crystal monitor 15 such that switching is performed from the image display, which is the present display, to the charging-level display.

With such a configuration, two kinds of display arrangements of the image display and the charging-level display can be alternately switched between using the release operation member.

Next, detailed description will be made below regarding the "DSC main" which is a routine performed in the event that the digital camera forming a part of the print system according to the present embodiment performs operations as a single camera, with reference to FIG. 14.

In the event that the present digital camera 10 is in the power-on state, and is in the state waiting for instruction signals occurring due to the user performing operations for the operation members, first, the DSC controller 13 of the present digital camera 10 confirms whether or not the state of the camera operation switch (SW) 14 has been changed, in Step S51. In this case, in the event that confirmation is made that instruction signals have occurred from the camera operation switch 14 due to the user performing operations for the predetermined operation member, the flow proceeds to the processing shown in Step S54. On the other hand, in the event that the state of the camera operation switch 14 has not been changed, the flow proceeds to the next processing shown in Step S52.

In Step S52, the DSC controller 13 performs processing for acquiring the image signals from the imaging unit 12, and converting the acquired image signals into image data in a predetermined format. Subsequently, the flow proceeds to the processing shown in Step S53.

In Step S53, the DSC controller 13 transmits the image data based upon the image signals acquired in the aforementioned processing in Step S52 to the liquid crystal monitor 15 through the video encoder circuit 13c, and display operation for the image is performed using the liquid crystal monitor 15. Subsequently, the flow returns to the processing shown in Step S51, and the following processing is periodically performed. Thus, an image is periodically displayed on the liquid crystal monitor 15, and accordingly, the user can observe the image based upon the image signals acquired from the imaging unit 12 on the liquid crystal monitor 15 until the user operates any operation member.

On the other hand, in the aforementioned processing shown in Step S51, in the event that the instruction signals from the camera operation switch 14 are confirmed, and the flow proceeds to the processing shown in Step S54, the processing is performed as follows.

First, in Step S54, the DSC controller 13 confirms the presence or absence of the instruction signals from the zoom switch (ZoomSW) of the camera operation switch 14. In the event that the instruction signals from the zoom switch (ZoomSW) are confirmed, the flow proceeds to the next processing shown in Step S55.

In Step S55, the DSC controller 13 performs operations corresponding to the instruction signals from the zoom switch (ZoomSW), e.g., performs setting of magnification for performing electronic zooming. In this case, the magnification mode is set to either the zoom-up (UP) mode or the zoom-down (DOWN) mode, for example. Upon ending the setting of the magnification mode, the flow returns to the above-described processing in Step S51, and the following processing is repeated, in order to detect the instruction signals from the next camera operation switch.

On the other hand, in the aforementioned Step S54, in the event that the instruction signals from the zoom switch (Zoom SW) are not confirmed, the flow proceeds to the processing shown in Step S56.

In Step S56, the DSC controller 13 confirms the presence or absence of the instruction signals from the release switch (SW). In the event that the instruction signals from the release switch are confirmed, the flow proceeds to the next processing shown in Step S57.

In Step S57, the DSC controller 13 communicates with the sub-controller 63, and requests the information with regard to the remaining battery power (remaining-battery-power information) from the sub-controller 63. As a result, the sub-controller 63 drives the dummy load so as to measure the voltage of the secondary battery 64 in this state, calculates the remaining battery power based upon the measurement results, and transmits the information with regard to the remaining battery power thus obtained to the DSC controller 13. Subsequently, the flow proceeds to the processing shown in Step S58. Note that the processing performed by the sub-controller 63 in this step is the same as the processing shown in Step S302 described later (see FIG. 19).

In Step S58, the DSC controller 13 confirms whether or not the image-taking operation can be performed, based upon the remaining-battery-power information obtained from sub-controller 63 in the aforementioned processing in Step S57. In this case, in the event that confirmation is made that the digital camera 10 is not in the state wherein image-taking can be performed, the flow proceeds to the processing shown in Step S64. On the other hand, in the event that confirmation is made that the digital camera 10 is in the state wherein image-taking can be performed, the flow proceeds to the next processing shown in Step S59.

In step S59, the DSC controller 13 performs processing for acquiring the image signals from the imaging unit 12, and converting the acquired image signals into image data in a predetermined format, in the same way as with the aforementioned processing in Step S52. Subsequently the flow proceeds to the processing shown in Step S60.

In Step S60, the DSC controller 13 performs data-conversion processing (data-compression processing) for converting the image data acquired in the aforementioned Step S59 into compressed data in JPEG format or the like. Subsequently, the flow proceeds to the processing shown in Step S61.

In Step S59, the DSC controller 13 performs processing for generating accessory information which is to be added to the acquired image data. The accessory information includes the information with regard to the date-and-time of image taking, ID of the information image for indicating image-taking conditions or the like, and the like, for example. Furthermore, an arrangement may be made wherein the accessory information generated in this step includes information or the like stipulated by DPOF (Digital Print Order Format) standards. Subsequently, the flow proceeds to the processing shown in Step S62.

In Step S62, the DSC controller 13 performs processing for storing and recording the image data acquired in the aforementioned processing in Step S59, and the accessory information generated in the aforementioned processing in Step S60, on a predetermined region of the recording medium 18. Subsequently, the flow returns to the aforementioned processing in Step S51, and the following processing is repeated.

On the other hand, in the event that the instruction signals from the release switch are not confirmed in the aforementioned Step S56, the flow proceeds to the processing shown in Step S63.

In Step S63, the DSC controller 13 confirms the state of the camera power source switch (SW). In this case, in the event that confirmation is made that the camera power source switch is on, the flow proceeds to the processing shown in Step S65, and predetermined processing corresponding to other switch (SW) operations is performed in Step S65. Subsequently, the flow returns to the aforementioned processing shown in Step S51, and the following processing is repeated.

On the other hand, in the above Step S63, in the event that confirmation is made that the camera power source switch is off, the flow proceeds to the next processing in Step S64, and the processing for system-down of the digital camera 10 is performed in the Step S64, following which the series of processing ends (END).

On the other hand, in the above-described processing in Step S58, in the event that confirmation is made that the present digital camera 10 is not in the state wherein image-taking can be performed, the flow proceeds to the processing shown in Step S64, as well, in order to perform processing for system-down of the digital camera 10. In Step S64, the processing for system down of the digital camera 10 is performed, following which a series of processing ends (END).

Note that the system-down processing performed in the aforementioned Step S64 is a series of processing formed of processing for saving and storing various kinds of data stored in the SDRAM 16 or the like, in a predetermined region of the recording medium 18 or the like, processing for stopping the operations of the power source circuit, and the like. Upon completing the system-down processing, power supply to each circuit is stopped, and accordingly, the DSC controller 13 stops the operation thereof, as well.

Next, detailed description will be made below regarding a sub-routine for printing processing performed by the print system according to the present embodiment, with reference to FIG. 15 through FIG. 18. The printing processing corresponds to the above-described processing in Step S22 and Step S94, shown in FIG. 3.

Figure 15:
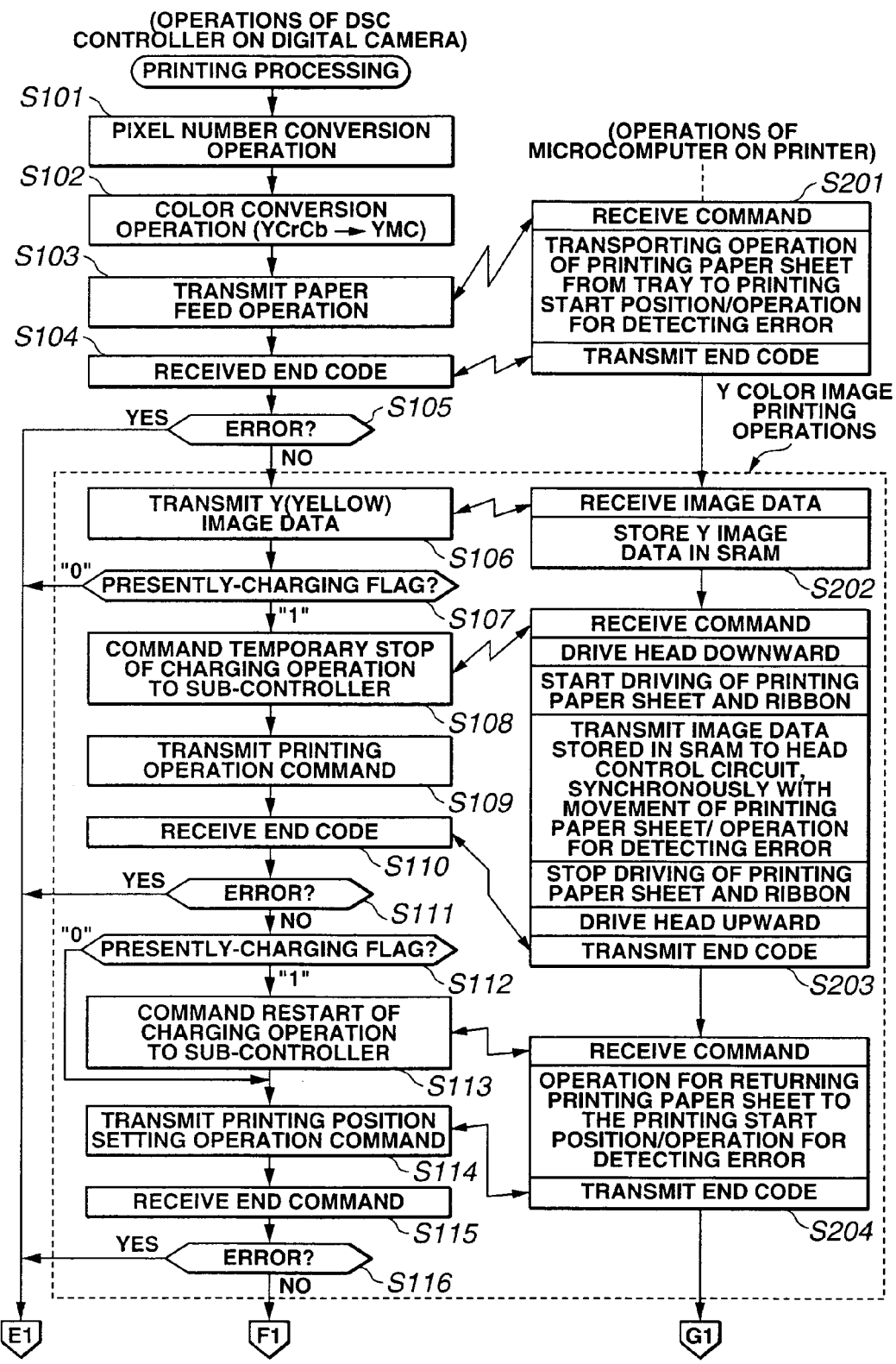
FIG. 15 is a flowchart which shows a part of a subroutine for printing operations performed by the print system shown in FIG. 1.

As described above, in the processing in Step S21 shown in FIG. 3, in the event that the DSC controller 13 confirms that the display state data has been set to "#2", the DSC controller 13 performs the processing in Step S22 shown in FIG. 3, i.e., performs the sub-routine for the printing processing shown in FIG. 15.

In Step S101 shown in FIG. 15, the DSC controller 13 reads out the image data (which will be referred to as "print subject image data" hereafter) stored in the SDRAM 16 or the like, which is to be subjected to printing processing (which will be referred to as "print processing" hereafter), and controls the image size conversion circuit 13d so as to perform pixel-number-conversion processing for the print subject image data. The pixel-number-conversion processing is performed for converting the decoded print subject image data to image data with a pixel number optimal for being subjected to print processing. Upon completion of this processing, the flow proceeds to the next processing shown in Step S102.

In Step S102, the DSC controller 13 controls the RISC controller 13f so as to perform color-conversion processing for generating YMC image data (complementary color image data). The aforementioned color conversion processing is performed for the print subject image data (YCrCb image data) generated by performing the pixel-number conversion processing in the aforementioned Step S101.

Note that the YMC image data thus generated is temporarily stored in the internal memory (which has capacity for storing one screen of image data) or the like within the DSC controller 13. Upon ending the color conversion processing, the flow proceeds to the processing shown in Step S103.

In Step S103, the DSC controller 13 transmits the instruction signals for performing paper-feed operations (paper-feed-operation instruction (command)) to the microcomputer 22. Subsequently, the flow proceeds to the processing shown in Step S104.

At the same time, on the side of the printer 60, the processing shown in Step S201 is performed. That is to say, in Step S201, the microcomputer 22 receives a paper feeding command transmitted from the DSC controller 13 in the above-described Step S103.

As a result, the microcomputer 22 controls the transporting motor 49 through the transporting motor driving circuit 50 such that the grip roller 47 is rotationally driven in a predetermined direction. Accordingly, the printing paper sheet 46 is picked up from the paper tray 45, and is transported, whereby the printing paper sheet 46 is fed to a predetermined print start position. A series of these operations will be referred to as "feeding operation" hereafter.

At the same time, the microcomputer 22 performs a predetermined error detecting operation. The error detecting operation performed in this Step is performed for confirming whether or not any operation error (error) or the like occurs, by monitoring the paper tray detecting switch 44, the paper position sensor 51, and the like. On the other hand, the error examples include an operation error occurring in the printer 60 during paper feeding operation, e.g., an operation error due to the printing paper sheet 46 being jammed (paper jam), and the like.

As described above, upon completion of the paper feeding operation and the error detecting operation at the side of the printer 60, the printer 60 enters the waiting state.

Note that while the error detecting operation is performed in the aforementioned processing shown in Step S201, in the event that error signals are detected in this Step, the microcomputer 22 sets the error information with regard to the paper feeding operation, immediately following which the microcomputer 22 stops the operations of the printer 60, and transmits the end code to the DSC controller 13.

On the other hand, on the side of the digital camera 10, in Step S104, the DSC controller 13 receives the end code transmitted from the printer 60 in the aforementioned Step S201. Subsequently, the flow proceeds to the processing in Step S105.

In Step S105, the DSC controller 13 confirms whether or not the end code transmitted from the microcomputer 22 includes error information. In this case, in the event that the received end code includes no error information, and accordingly, confirmation is made that any paper feeding operation error has not occurred, the flow proceeds to the next processing shown in Step S106. On the other hand, in the event that the received end code includes error information, and accordingly, confirmation is made that a paper feed error has occurred, a series of printing processing ends, and the flow returns to the main routine (RETURN; see the processing denoted by the reference characters E1, E2, and E3, in FIG. 15 through FIG. 18).

On the other hand, in the event that no paper feed error is detected, and the flow proceeds to the processing shown in Step S106, the DSC controller 13 and the microcomputer 22 perform printing operations for a Y-color image while communicating with each other in the following processing, e.g., in the processing shown in Step S106 through Step S116 (on the side of the DSC controller 13 of the digital camera 10) and the processing shown in Step S202 through Step S204 (on the side of the microcomputer 22 of the printer 60).

That is to say, in Step S106, the DSC controller 13 performs image data transporting processing for transporting the Y-color image data (one screen) of the YMC image data generated by performing the aforementioned processing shown in Step S102 to the microcomputer 22 of the printer 60. Upon completion of the transporting processing for the Y-color image data, the flow proceeds to the next processing shown in Step S107.

As a result, the microcomputer 22 of the printer 60 receives the Y-color image data transmitted from the DSC controller 13 of the digital camera 10 in Step S202, and temporarily stores and records the Y-color image data in the SRAM 24. Subsequently, the printer 60 enters the waiting state.

In the aforementioned Step S106, upon completion of the transporting processing for the Y-color image data of one frame, and the flow proceeding to the next processing shown in Step S107, the DSC controller 13 confirms the state of the presently-charging flag in the Step S107. In this case, in the event that the presently-charging flag has been set to "0", determination is made that the charging operation has been completed, and the flow proceeds to the processing shown in Step S109. On the other hand, in the event that the presently-charging flag has been set to "1", determination is made that the charging operation has not been completed (non-completion state), and the flow proceeds to the next processing shown in Step S108.

In Step 108, the DSC controller 13 transmits command signals (command) to the sub-controller 63 so as to temporarily stop the charging operation. Subsequently, the flow proceeds to the processing shown in Step S109.

In general, with thermal sublimation printers employed as the printer 60 according to the present embodiment, maximal electric power is used at the time of driving the thermal head 38. At the time of driving the thermal head 38 so as to perform printing operations, even in the event that charging operation for the secondary battery 64 is temporarily stopped, any operation error does not occur in the printer system.

However, the operation wherein charging operation is temporarily stopped necessitates an extension of the duration required for completion of charging.

In this case, in order to prevent occurrence of an extension of the charging time, an arrangement may be made wherein the amount of power supply from the AC adapter or the like is increased so as to perform the charging operation and the printing operation in parallel.

However, in the event that the amount of power supply from the AC adapter is increased, the size of the AC adapter is increased, leading to a problem of increased costs.

On the other hand, the print system having a configuration wherein the charging operation is forbidden only at the time of driving the thermal head 38 exhibits a markedly reduced extension of the charging time as compared with a configuration wherein the charging operation is temporarily stopped during printing operations.

Accordingly, the print system according to the present embodiment employs a configuration wherein the charging operation is forbidden only at the time of driving the thermal head 38.

In Step S109, the DSC controller 13 transmits instruction signals (a command) for instructing the printing operation to the microcomputer 22. Subsequently, the flow proceeds to the next processing shown in Step S110.

In Step S110, the DSC controller 13 is maintained in the waiting state until the DSC controller 13 receives the end code from the microcomputer 22. Upon the DSC controller 13 receiving the end code, the flow proceeds to the next processing shown in Step S111.

Upon the microcomputer 22 receiving the printing operation instruction command from the DSC controller 13 in Step S203, the microcomputer 22 performs processing for printing the Y-color image data on the printing paper sheet 46. The printing operation is performed as follows.

First, the microcomputer 22 performs head-down driving for moving the head arm 39 including the thermal head 38 to a predetermined head-down position from a predetermined head-up position by controlling the head positioning control motor 41 through the head motor driving circuit 42 so as to drive and control the cam 40. The aforementioned head-down driving is performed for pressing the ink ribbon 33 into contact with the printing paper sheet 46.

Subsequently, the microcomputer 22 drives and controls the transporting motor 49 through the transporting motor driving circuit 50 such that the grip roller 47 is rotationally driven in a predetermined direction. Accordingly, paper transporting operation is started for moving the printing paper sheet 46 at a predetermined speed in a predetermined direction.

At the same time, the microcomputer 22 drives and controls the ribbon motor 30 through the ribbon motor driving circuit 31 so as to start winding operation for the ink ribbon 33.

Furthermore, the microcomputer 22 performs data transfer operation wherein the Y-color image data is read out for each line from the SRAM 24, synchronously with the movement of the printing paper sheet 46, and the read-out data is transmitted to the thermal head control circuit 25.

Upon ending the data transfer operation for the Y-color image data of one screen, the paper transporting operation for the printing paper sheet 46 and the winding operation for the ink ribbon 33 are stopped, following which the head arm 39 including the thermal head 38 is moved to the predetermined head-up position. Thus, the contact state, wherein the ink ribbon 33 and the printing paper sheet 46 are pressed into contact with each other, is released.

Upon completion of a series of these operations, the microcomputer 22 transmits a predetermined end code to the DSC controller 13. Subsequently, the printer 60 enters the waiting state.

Note that the microcomputer 22 performs a predetermined error detecting operation in parallel with the Y-color data transfer operation. The error detecting operation performed in this Step is performed for confirming whether or not any operation error (error) has occurred by monitoring the temperature sensor 37, the ribbon position detector 36, the head position sensor 43, the paper position sensor 51, and the like, for example.

In this case, in the event that any operation error is detected by the head position sensor 43 during the head-down driving or head-up driving for the thermal head 38, the driving operation is stopped, and the microcomputer 22 transmits the end code including predetermined error information to the DSC controller 13, for example. The error information is stored in the non-volatile memory 53 or the like as head-positioning information.

Furthermore, in the event that any error due to paper jam or the like is detected by the paper position sensor 51 during transporting operation for the printing paper sheet 46, the transporting operation is stopped, and the microcomputer 22 transmits the end code including predetermined error information to the DSC controller 13, for example. The error information is stored in the non-volatile memory 53 or the like as paper-feed-operation information.

Furthermore, in the event that any error due to the ink ribbon running out or the like is detected by the ribbon position detector 36 during the ribbon-winding operation for the ink ribbon 33, the ribbon-winding operation is stopped, and the microcomputer 22 transmits the end code including predetermined error information to the DSC controller 13, for example. The error information is stored in the non-volatile memory 53 or the like as ribbon-winding-operation information.

On the other hand, as described above, upon the DSC controller 13 receiving the end code from the microcomputer 22 in Step S110, the flow proceeds to the next processing shown in Step S111, and in Step S111, confirmation is made whether or not any error information is included in the end code received in the aforementioned Step S110. In the event that confirmation is made that any error information is included in the end code, a series of printing operations ends, and the flow returns back to the main routine (RETURN; see the processing denoted by reference characters E1, E2, and E3, in FIG. 15 through FIG. 18).

On the other hand, in the event that no error information is detected, determination is made that the printing operation for the Y-color image data of one screen has been performed with no problem, and the flow proceeds to the next processing shown in Step S112.

In Step S112, the DSC controller 13 confirms the state of the presently-charging flag. In this case, in the event that the presently-charging flag has been set to "0", the charging operation has been completed, and accordingly, the flow proceeds to the processing shown in Step S114. On the other hand, in the event that the presently-charging flag has been set to "1", the charging operation has not been completed (non-completion state), and accordingly, determination is made that the charging operation has been temporarily stopped in the above Step S108, and the flow proceeds to the next processing shown in Step S113.

In Step S113, the DSC controller 13 transmits the instruction signals (command) for restarting the charging operation to the sub-controller 63. Subsequently, the flow proceeds to the processing shown in Step S114.

In Step S114, the DSC controller 13 transmits the instruction signals (command) to the microcomputer 22 for setting the printing paper sheet 46 to a predetermined print start position. Subsequently, the flow proceeds to the next processing shown in step S115.

In Step S115, the DSC controller 13 is maintained in the waiting state until the DSC controller 13 receives the end code from the microcomputer 22. Upon the DSC controller 13 receiving the aforementioned end code, the flow proceeds to the next processing shown in Step S116.

Upon the microcomputer 22 receiving the printing operation instruction command from the DSC controller 13 in Step S204, the microcomputer 22 drives and controls the transporting motor 49 through the transporting motor driving circuit 50 such that the grip roller 47 is rotationally driven in a predetermined direction (direction wherein the paper sheet is returned back to the start position). Thus, the printing paper sheet 46 is moved in the predetermined direction, whereby the printing paper sheet 46 is set to the predetermined printing start position. Upon completion of the paper feed operation, the microcomputer 22 transmits a predetermined end code to the DSC controller 13. Subsequently, the printer 60 enters the waiting state.

Note that in this case, the microcomputer 22 confirms whether or not any operation error (error) has occurred due to malfunctioning of the paper-feed operation, with the paper position sensor 51, in parallel with the paper feeding operation, as well.

In this case, in the event that the paper position sensor 51 detects occurrence of any operation error due to the printing paper sheet 46 jamming or the like, the paper feeding operation is stopped, and the microcomputer 22 transmits the end code including predetermined error information to the DSC controller 13. The error information is stored in the non-volatile memory 53 or the like as paper-feed-operation information.

Upon the DSC controller 13 receiving the end code from the microcomputer 22 in Step S115 as described above, the flow proceeds to the next processing shown in Step S116, and confirmation is made whether or not any error information is included in the received end code in the aforementioned Step S115. In this case, in the event that confirmation is made that the end code includes any error information, the series of printing processing is stopped, and the flow returns back to the main routine (RETURN; see the processing denoted by the reference characters E1, E2, and E3, in FIG. 15 through FIG. 18).

Figure 16:
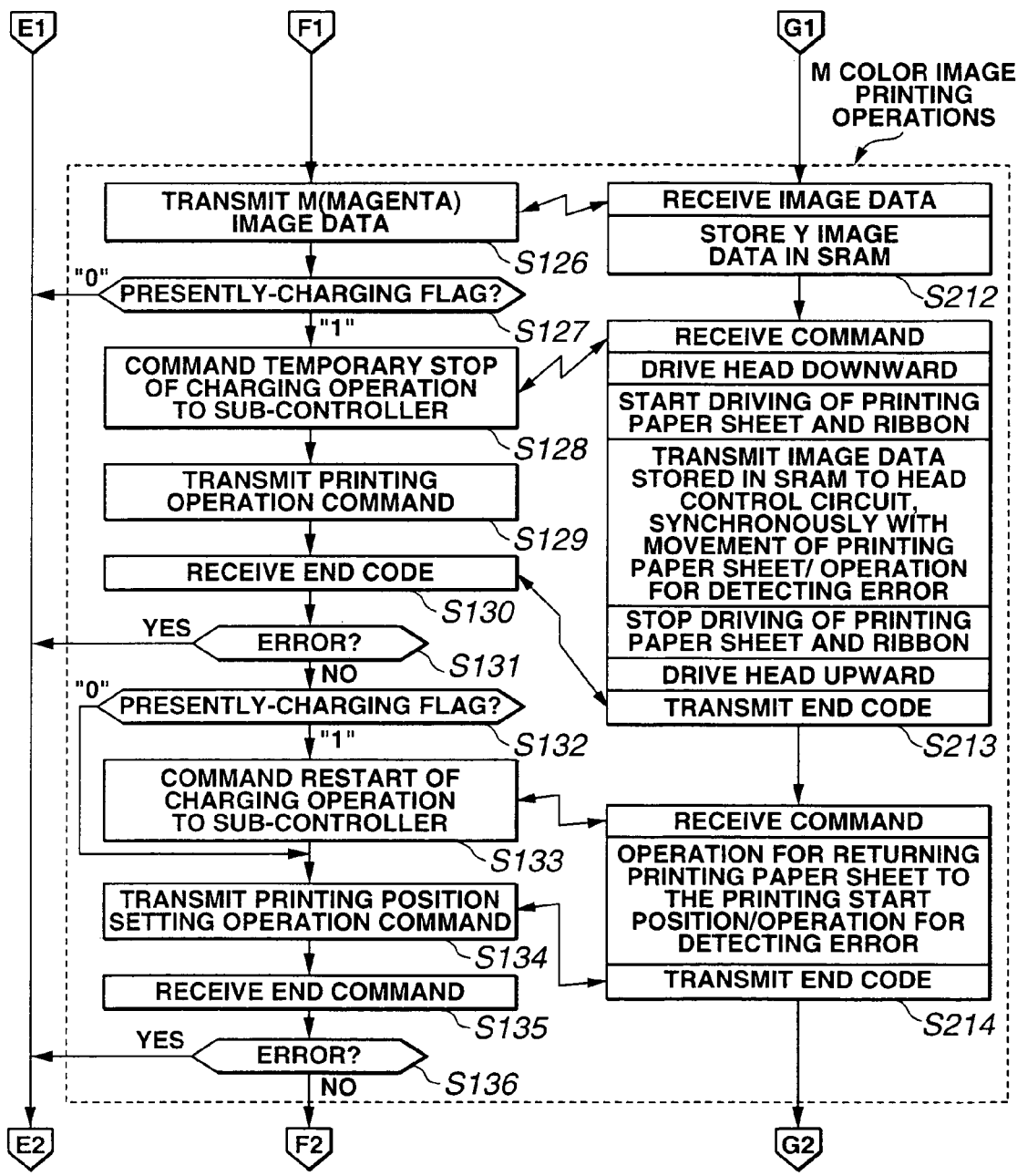
FIG. 16 is a flowchart which shows a part of the subroutine for printing operations performed by the print system shown in FIG. 1.

On the other hand, in the event that the error information is not confirmed, the flow proceeds to the processing in Step S126 shown in FIG. 16 in order to perform following printing operation for the M-color image data of one screen (see the processing denoted by the reference characters F1 in FIG. 15 and FIG. 16).

In the processing in Step S126 through Step S136 shown in FIG. 16 (on the side of the DSC controller 13 of the digital camera 10), and the processing in Step S212 through Step S214 (on the side of the microcomputer 22 of the printer 60), the DSC controller 13 and the microcomputer 22 perform printing operations for the M-color image while communicating with each other.

Here, the processing routine (Step S126 through Step S136 in FIG. 16) for performing printing operation for the M-color image by the DSC controller 13 of the digital camera 10 is the same processing as with the above-described processing routine (Step S106 through Step S116 in FIG. 15) for performing printing operation for the Y-color image by the DSC controller 13, except for the color of the image subjected to the printing processing, i.e., the M-color image data (one screen) is subjected to the printing processing instead of the Y-color image data (one screen) of the YMC image data.

Furthermore, in the same way, the processing routine (Step S212 through Step S214 in FIG. 16) for performing printing operation for the M-color image by the microcomputer 22 of the printer 60 is the same processing as with the above-described processing routine (Step S202 through Step S204 in FIG. 15) for performing printing operation for the Y-color image by the aforementioned microcomputer 22, except for the color of the image subjected to the printing processing, i.e., the M-color image data (one screen) is subjected to the printing processing instead of the Y-color image data (one screen) of the YMC image data.

Accordingly, details of the printing operation for the M-color image can be understood with reference to the above-described printing operation for the Y-color image, and detailed description thereof will be omitted.

Figure 17:
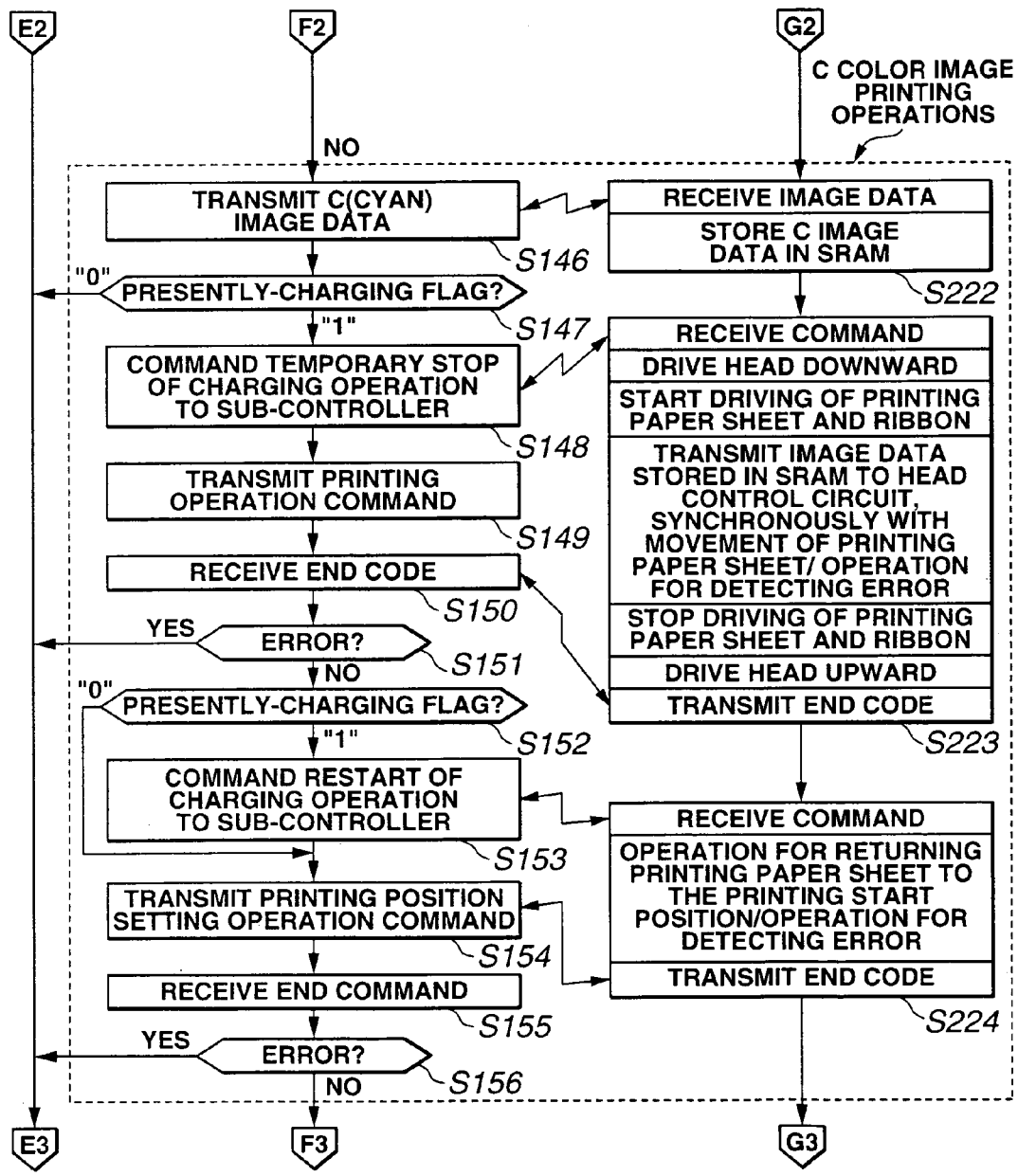
FIG. 17 is a flowchart which shows a part of the subroutine for printing operations performed by the print system shown in FIG. 1.

Upon ending the printing operation for the M-color image without detecting any error, the flow proceeds to the processing in Step S146 shown in FIG. 17 in order to perform printing operation for the following printing operation for the C-color image data of one screen (see the processing denoted by the reference character F2 in FIG. 16 and FIG. 17).

In the processing in Step S146 through Step S156 shown in FIG. 17 (on the side of the DSC controller 13 of the digital camera 10), and the processing in Step S222 through Step S224 (on the side of the microcomputer 22 of the printer 60), the DSC controller 13 and the microcomputer 22 perform printing operations for the C-color image while communicating with each other.

Here, the processing routine (Step S146 through Step S156 in FIG. 17) for performing printing operation for the C-color image by the DSC controller 13 of the digital camera 10 is the same processing as with the above-described processing routine (Step S106 through Step S116 in FIG. 15, or Step S126 through Step S136 in FIG. 16) for performing printing operation for the Y-color image or the M-color image by the DSC controller 13, except for the color of the image subjected to the printing processing, i.e., the C-color image data (one screen) is subjected to the printing processing instead of the Y-color image data (one screen) or the M-color image data (one screen) of the YMC image data.

Furthermore, in the same way, the processing routine (Step S222 through Step S224 in FIG. 17) for performing printing operation for the C-color image by the microcomputer 22 of the printer 60 is the same processing as with the above-described processing routine (Step S202 through Step S204 in FIG. 15, or Step S212 through Step S214 in FIG. 16) for performing printing operation for the Y-color image or the M-color image by the aforementioned microcomputer 22, except for the color of the image subjected to the printing processing, i.e., the C-color image data (one screen) is subjected to the printing processing instead of the Y-color image data (one screen) or the M-color image data (one screen), of the YMC image data.

Accordingly, details of the printing operation for the C-color image can be understood with reference to the above-described printing operation for the Y-color image or the M-color image, and detailed description thereof will be omitted.

Figure 18:
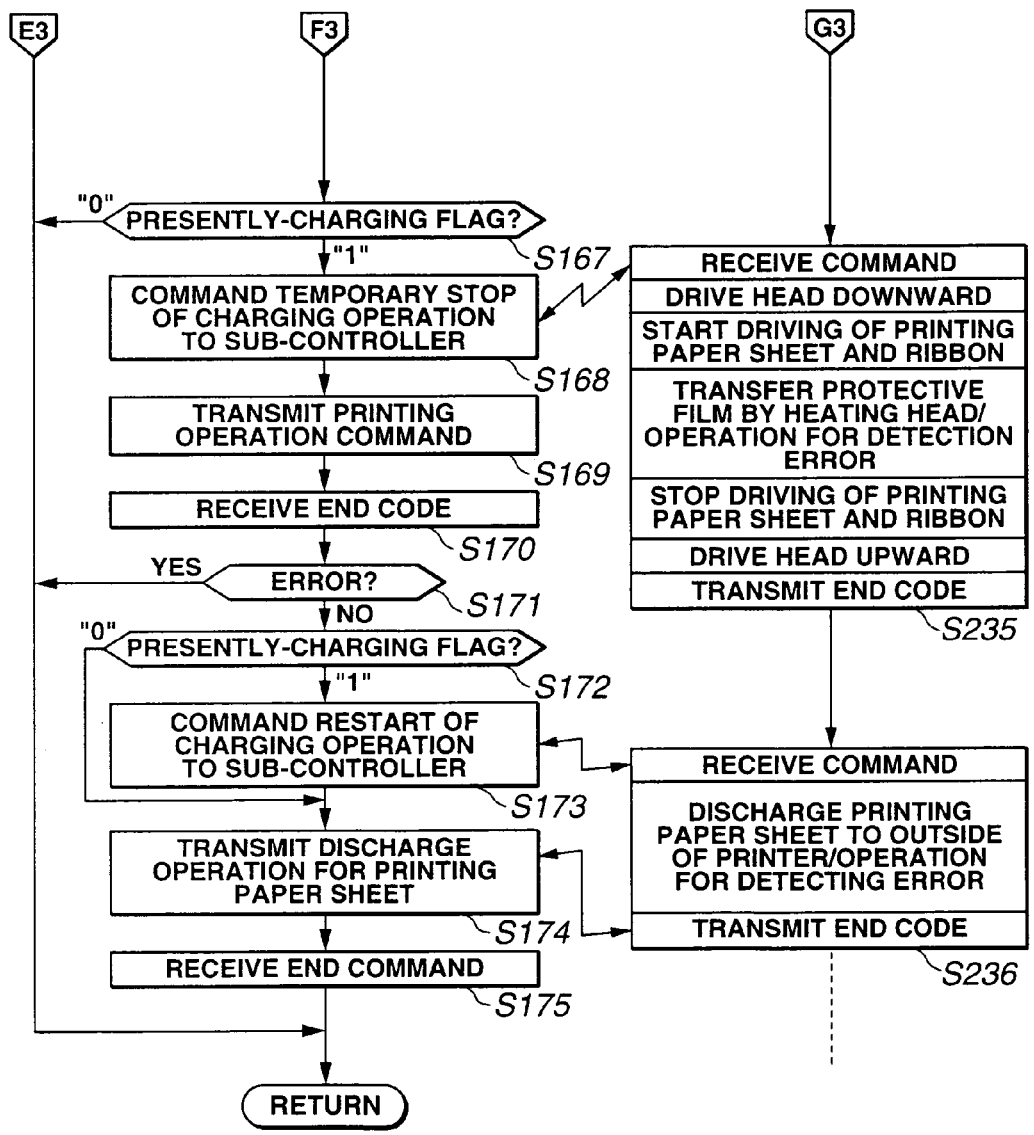
FIG. 18 is a flowchart which shows a part of the subroutine for printing operations performed by the print system shown in FIG. 1.

Upon ending the printing operation for the C-color image without detecting any error, the flow proceeds to the next processing in Step S167 shown in FIG. 18 in order to perform overcoat processing (see the processing denoted by the reference character F3 in FIG. 17 and FIG. 18).

The aforementioned overcoat processing is performed for coating the surface of the printing paper sheet wherein various kinds of color images of Y-color image, M-color image, and C-color image, have been printed based upon the YMC image data, with a protective layer, and is generally the same processing as the above-described printing operation for each color image.

That is to say, first, in Step S167, the DSC controller 13 confirms the state of the presently-charging flag as with each processing shown in the aforementioned Step S107, Step S127, and Step S147, and in the event that the battery is charging, the charging operation is temporarily stopped.

Subsequently, the processing shown in Step S167 through Step S175 (on the side of the DSC controller 13 of the digital camera 10), and the processing shown in Step S235 and Step S236, is performed in conjunction with the aforementioned processing.

Subsequently, the microcomputer 22 transmits a predetermined end code to the DSC controller 13 in Step S236.

Note that the microcomputer 22 performs operations for detecting an error, even during the printing operation. The error detecting operation is performed for confirming whether or not any operation error (error) occurs, by monitoring the temperature sensor 37, the ribbon position detector 36, the head position sensor 43, the paper position sensor 51, and the like. That is to say, the protective-layer-coating operation has the same processing routine as with the printing operation for each color (Y-color, M-color, and C-color) described above with reference to FIG. 15, FIG. 16, and FIG. 17.

Finally, upon the DSC controller 13 receiving a predetermined end code in Step S175, a series of printing processing ends, and the flow returns back to the main routine (RETURN).

Next, detailed description will be made regarding a subroutine for the operations of the sub-controller 63 of the print system according to the present embodiment, with reference to FIG. 19 and FIG. 20.

In the event that the secondary battery 64 is loaded in a predetermined portion within the main unit of the digital camera 10 so that electric power is supplied from the secondary battery 64, or in the event that the digital camera 10 and the printer 60 are connected one to another so that electric power is supplied from the printer 60, the sub-controller 63 starts operations.

Figure 19:
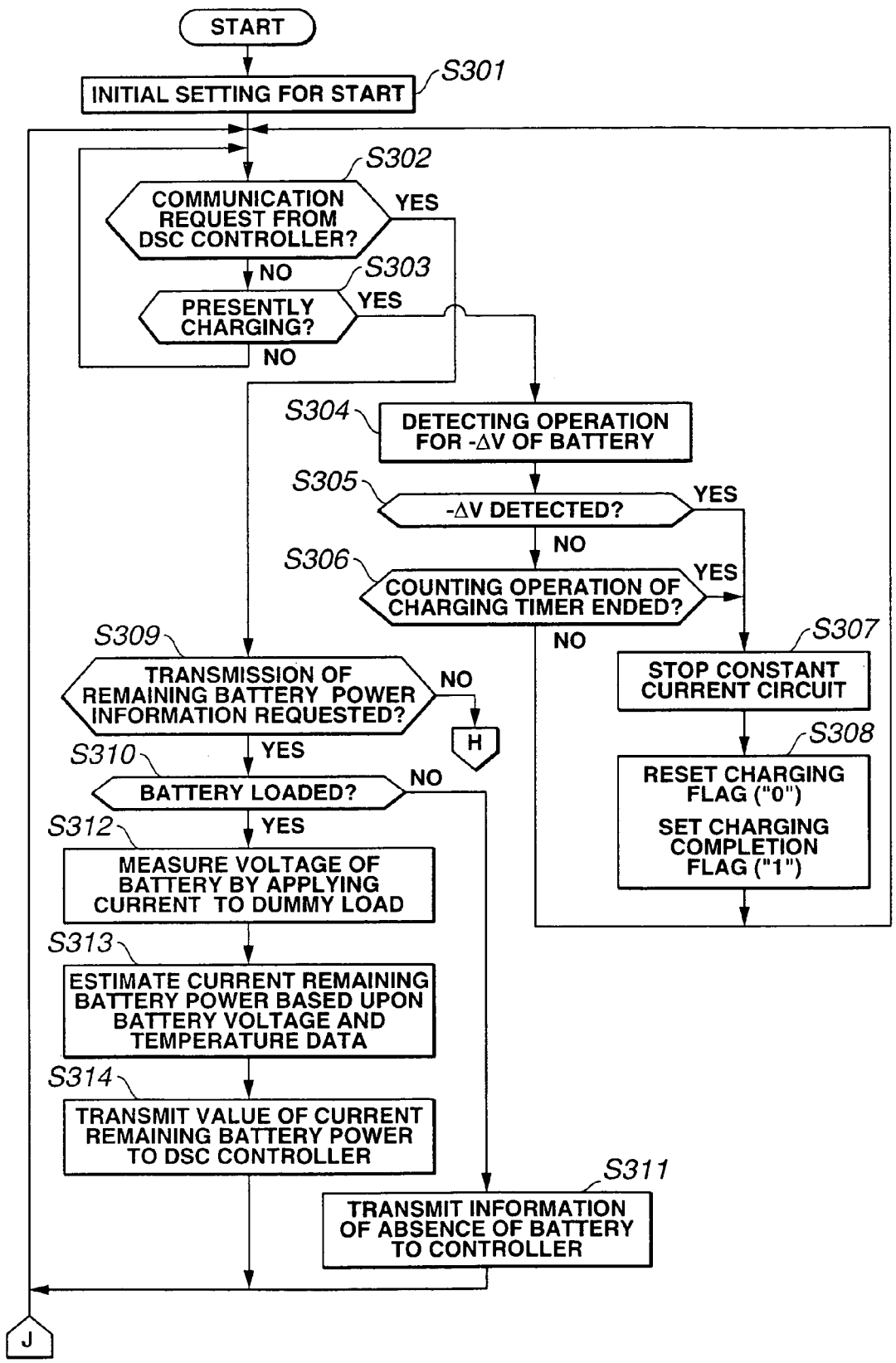
FIG. 19 is a flowchart which shows a part of the operations performed by a sub-controller of the digital camera forming the print system shown in FIG. 1.

First, in Step S301 shown in FIG. 19, the sub-controller 63 performs initial setting operations for start-up. In the aforementioned initial setting operations for start-up, the memory and the IO port are initialized, for example. Subsequently, the flow proceeds to the processing shown in Step S302.

In Step S302, the sub-controller 63 confirms the presence or absence of the communication request signals from the DSC controller 13. In this case, in the event that the communication request signals from the DSC controller 13 are confirmed, the flow proceeds to the processing shown in Step S309. On the other hand, in the event that the communication request signals from the DSC controller 13 are not confirmed, the flow proceeds to the processing shown in Step S303.

In the Step S303, the sub-controller 63 confirms whether or not the battery is being charged, by confirming the state of the presently-charging flag. In this case, in the event that confirmation is made that the battery is charging (the presently-charging flag has been set to "1"), the flow proceeds to the processing shown in Step S304. On the other hand, in the event that confirmation is made that the charging operation is not being performed (the presently-charging flag has been set to "0"), the flow returns back to the aforementioned process shown in Step S301, and the following processing is repeated.

In the event that the communication request from the DSC controller 13 has been confirmed in the aforementioned processing shown in Step S302, and the flow proceeds to the next processing shown in Step S309, the sub-controller 63 confirms whether or not the communication request from the DSC controller 13 has been transmitted for requesting the remaining-battery-power information. In this case, in the event that confirmation is made that the communication request has been transmitted for requesting the remaining-battery-power information, the flow proceeds to the next processing shown in Step S310. On the other hand, in the event that the communication request has been transmitted for a request other than the request for the remaining-battery-power information, the flow proceeds to the processing in Step S315 shown in FIG. 20 (see the processing denoted by the reference character H shown in FIG. 19 and FIG. 20). Note that the communication request for remaining-battery-power information transmitted to the sub-controller 63 from the DSC controller 13 is performed in each processing shown in the aforementioned Step S4 (FIG. 3) and Step S57 (FIG. 14).

Subsequently, in Step S310, the sub-controller 63 confirms whether or not the secondary battery 64 is loaded, in Step S310. With the confirmation, the AD converter 63a included within the sub-controller 63 measures the voltage of the battery, and in the event that the measured output indicates zero, determination is made that the secondary battery 64 has not been loaded.

In the event that determination is made that the secondary battery 64 has not been loaded, the flow proceeds to the processing shown in Step S311, and the sub-controller 63 transmits the information of the fact that the secondary battery 64 has not been loaded (does not exist), to the DSC controller 13. Subsequently, the flow returns back to the aforementioned processing shown in Step S302, and the following processing is repeated.

On the other hand, in the event that confirmation is made that the secondary battery 64 has been loaded, in the aforementioned Step S310, the flow proceeds to the next processing shown in Step S312.

In Step S312, the sub-controller 63 switches Q01 to on-state so as to apply a current from the secondary battery 64 to the dummy load resistor R04, whereby a dummy load is applied to the secondary battery 64. The battery voltage in this state is measured with the AD converter 63a. Subsequently, the flow proceeds to the processing shown in Step S313.

In Step S313, the sub-controller 63 converts the output from the temperature sensor 67 using the AD converter 63a so as to perform detection of the temperature. Subsequently, the sub-controller 63 calculates an estimated value of the remaining power (remaining battery power) of the secondary battery 64 at the present point in time based upon the detected temperature value and the battery voltage value measured in the aforementioned processing shown in Step S312. Subsequently, the flow proceeds to the processing shown in Step S314.

In Step S314, the sub-controller 63 transmits the estimated value of the remaining battery power (remaining-battery-power information) calculated in the aforementioned processing shown in Step S313, to the DSC controller 13. Subsequently, the flow returns to the aforementioned processing in Step S302 so that the sub-controller 63 receives the next communication request from the DSC controller 13, and the following processing is repeated.

On the other hand, in the event that confirmation is made that the battery is charging, in the aforementioned processing in Step S303, and the flow proceeds to the processing in Step S304, the sub-controller 63 performs detecting operation for $-\Delta V$ of the secondary battery 64, in Step S304. Subsequently, the flow proceeds to the processing in Step S305.

Note that the detecting operation for $-\Delta V$ of the secondary battery 64 is performed as follows.

In general, a nickel-hydrogen battery or the like is employed as the secondary battery 64 employed in a conventional digital camera, for example. It is well known that the aforementioned nickel-hydrogen battery has a nature wherein, in the event that a rapid charging operation is performed for the nickel-hydrogen battery, the battery voltage slightly drops at the point of time of the charging amount reaching 100% (full-charged state) (see FIG. 21).

Figure 21:
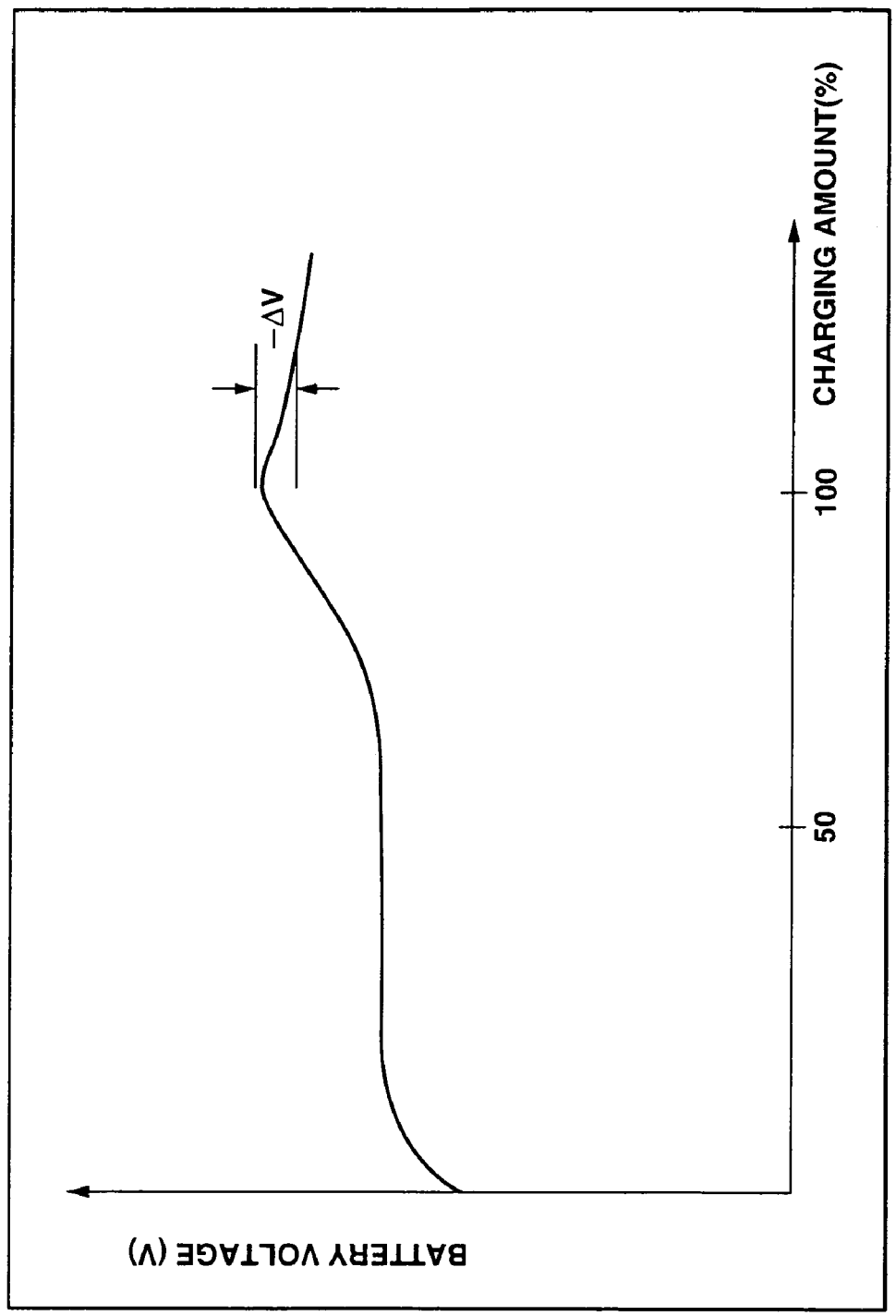
FIG. 21 is a chart which shows the relation between the charging amount and the battery voltage, with regard to a secondary battery employed in conventional and general digital cameras.

Accordingly, with the present embodiment, a predetermined amount of the voltage drop following the secondary battery 64 becoming full-charged is defined as $(-\Delta V)$ as shown in FIG. 21, the battery voltage is periodically measured during the charging operation for the secondary battery 64, and upon detecting the predetermined voltage drop $(-\Delta V)$, determination is made that the secondary battery 64 has reached the full-charged state, and the charging operation being performed is stopped.

That is to say, the sub-controller 63 confirms whether or not the predetermined voltage drop $(-\Delta V)$ has been detected, in Step S305. In this case, in the event that the voltage drop $(-\Delta V)$ has been detected, the flow proceeds to the processing shown in Step S307.

Subsequently, the sub-controller 63 stops the charging operation of the constant current circuit 66 in Step S307. Subsequently, the flow proceeds to the processing shown in Step S308.

In Step S308, the sub-controller 63 resets the presently-charging flag (initializes, or set to "0"), as well as setting the charging-completion flag to "1". Subsequently, the flow returns to the processing shown in Step S302, and the following processing is repeated.

On the other hand, in the event that the voltage drop $(-\Delta V)$ has not been detected in the aforementioned processing in Step S305, the flow proceeds to the processing shown in Step S306, the sub-controller 63 confirms whether or not the counting operation of the charging timer has ended. In this case, in the event that confirmation is made that the aforementioned counting operation has ended, the flow proceeds to the aforementioned processing in Step S307 in order to forcibly stop the charging operation. On the other hand, in the event that the end of the counting operation has not been confirmed, i.e., in the event that the counting operation is being performed, the flow returns to the aforementioned processing shown in Step S302, and the following processing is repeated.

For example, the sub-controller 63 fails in detecting the voltage drop $(-\Delta V)$ of the secondary battery 64, the charging operation is continued, often leading to a problem that the secondary battery 64 becomes overcharged. Accordingly, the aforementioned processing shown in Step S306 is provided in order to prevent the secondary battery 64 from becoming overcharged.

Figure 20:
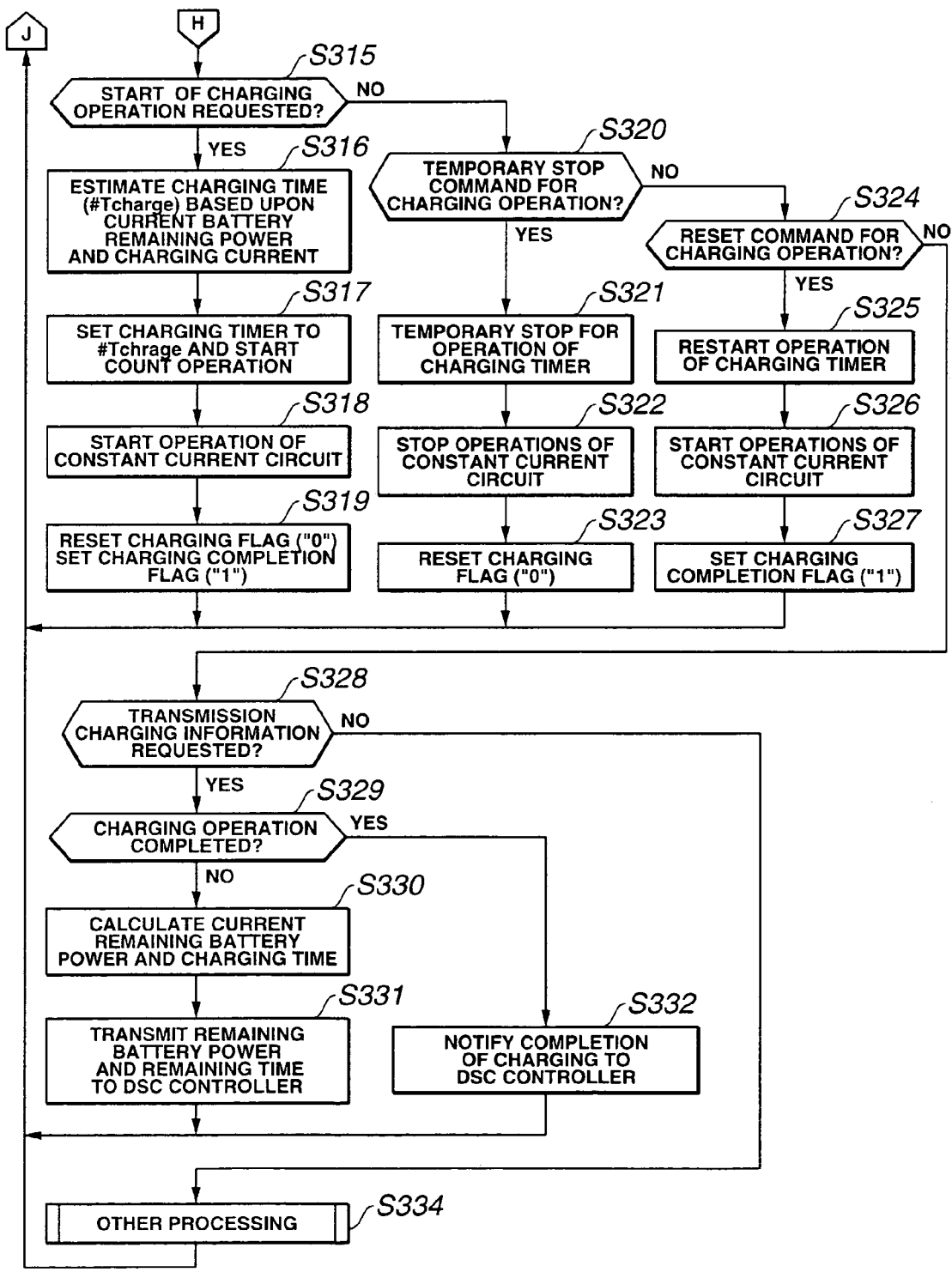
FIG. 20 is a flowchart which shows a part of the operations performed by the sub-controller of the digital camera forming the print system shown in FIG. 1.

In the aforementioned processing shown in Step S309, in the event that the communication request from the DSC controller 13 has been transmitted for a request other than the request for the remaining-battery-power information, and the flow proceeds to the processing in Step S315 shown in FIG. 20, the sub-controller 63 confirms whether or not the communication request from the DSC controller 13 has been transmitted for requesting the start of the charging operation, in Step S315. In this case, in the event that confirmation is made that the communication request has been transmitted for requesting the start of the charging operation, the flow proceeds to the next processing shown in Step S316. On the other hand, in the event that the communication request has not been transmitted for requesting the start of the charging operation, the flow proceeds to the processing shown in Step S320. Note that the communication request for requesting the start of the charging operation is transmitted from the DSC controller 13 to the sub-controller 63 in the aforementioned processing in Step S7 (FIG. 3).

Subsequently, in Step S316, the sub-controller 63 calculates an estimated value of the charging time (#Tcharge) required for the secondary battery 64 reaching the full-charged state based upon the remaining battery power of the secondary battery 64 and the output current value of the constant current circuit 66 at the present point of time. Subsequently, the flow proceeds to the processing in step S317.

In Step S317, the sub-controller 63 assigns the internal timer thereof to the charging timer, and sets the charging timer to "#Tcharge", following which the counting operation is started. Subsequently, the flow proceeds to the processing in Step S318.

In Step S318, the sub-controller 63 starts the operations of the constant current circuit 66. Subsequently, the flow proceeds to the processing in step S319.

In Step S319, the sub-controller 63 resets the charging-completion flag (initializes or set to "0"), as well as setting the presently-charging flag to set "1". Subsequently, the flow returns to the processing in Step S302 shown in FIG. 19, and the following processing is repeated.

In the aforementioned processing in Step S315, in the event that the communication request from the DSC controller 13 has been transmitted for a request other than the request for the start of the charging operation, and the flow proceeds to the processing in Step S320, the sub-controller 63 confirms whether or not the communication request from the DSC controller 13 has been transmitted for requesting the temporary stop of the charging operation, in Step S320. In this case, in the event that confirmation is made that the communication request from the DSC controller 13 has been transmitted for requesting the temporary stop of the charging operation, the flow proceeds to the next processing in Step S321. On the other hand, in the event that the communication request has been transmitted for a request other than the request for the temporary stop of the charging operation, the flow proceeds to the processing in Step S324. Note that the communication request for requesting the temporary stop of the charging operation is transmitted from the DSC controller 13 to the sub-controller 63 in the aforementioned Step S108 (FIG. 15), Step S128 (FIG. 16), Step S148 (FIG. 17), and Step S168 (FIG. 18).

In Step S321, the sub-controller 63 temporarily stops the counting operation of the charging timer. Subsequently, the flow proceeds to the processing in Step S322.

In Step S322, the sub-controller 63 stops the operation of the constant current circuit 66. Subsequently, the flow proceeds to the processing in Step S323.

In Step S323, the sub-controller 63 resets (initializes, which is setting to "0") the presently-charging flag. Subsequently, the flow returns to the processing in Step S302 shown in FIG. 19, and the following processing is repeated.

In the aforementioned processing in Step S320, in the event that the communication request from the DSC controller 13 has been transmitted for a request other than the request for the temporary stop of the charging operation, and the flow proceeds to the processing in step S324, the sub-controller 63 confirms whether or not the communication request from the DSC controller 13 has been transmitted for the restart of the charging operation, in the Step S324. In this case, in the event that confirmation is made that the communication request has been transmitted for the restart of the charging operation, the flow proceeds to the next processing in Step S325. On the other hand, in the event that the communication request has been transmitted for a request other than the request for the restart of the charging operation, the flow proceeds to the processing in Step S328. Note that the communication request for requesting the restart of the charging operation is transmitted from the DSC controller 13 to the sub-controller 63 in the aforementioned Step S113 (FIG. 15), Step S133 (FIG. 16), Step S153 (FIG. 17), and Step S173 (FIG. 18).

In Step S325, the sub-controller 63 restarts the counting operation of the charging timer. Subsequently, the flow proceeds to the processing in Step S326.

In Step S326, the sub-controller 63 restarts the charging operation of the constant current circuit 66. Subsequently, the flow proceeds to the processing in Step S327.

In Step S327, the sub-controller 63 sets the presently-charging flag to "1". Subsequently, the flow returns to the processing in Step S302 shown in FIG. 19, and the following processing is repeated.

In the aforementioned processing in step S324, in the event that the communication request from the DSC controller 13 has been transmitted for a request other than the request for the restart of the charging operation, and the flow proceeds to the processing in Step S328, the sub-controller 63 confirms whether or not the communication request from the DSC controller 13 has been transmitted for requesting the transmission of the charging-state information, in the Step S328. In this case, in the event that the communication request from the DSC controller 13 has been transmitted for a request other than the request for transmission of the charging-state information, the flow proceeds to the processing in Step S334, and the sub-controller 63 performs processing corresponding to other communication requests in Step S334. Subsequently, the flow returns to the aforementioned processing in Step S302 (see the processing denoted by the reference character J in FIG. 20 and FIG. 19), and the following processing is repeated.

On the other hand, in the event that confirmation is made that the communication request from the DSC controller 13 has been transmitted for requesting transmission of the charging-state information in the aforementioned Step S328, the flow proceeds to the next processing in Step S329. Note that the communication request for the restart of the charging operation is transmitted from the DSC controller 13 to the sub-controller 63 in the aforementioned processing in Step S14 (FIG. 3).

In Step S329, the sub-controller 63 confirms whether or not the charging operation has been completed based upon the state of the charging completion flag. In the event that the charging completion flag has been set to "1", the charging operation has been completed, and accordingly the flow proceeds to the next processing in Step S332.

In Step S332, the sub-controller 63 notifies the DSC controller 13 that the charging operation for the secondary battery 64 has been completed. Subsequently, the flow returns to the aforementioned processing in Step S302 (see the processing denoted by the reference character J in FIG. 20 and FIG. 19), and the following processing is repeated.

On the other hand, in the event that the charging-completion flag has not been set (has been set to "0") in the aforementioned Step S329, the battery is charging, and accordingly, the flow proceeds to the next processing in Step S330.

In Step S330, the sub-controller 63 calculates the remaining battery power at the present point of time, and an estimated charging time required for the battery reaching the full-charged state, based upon the information such as the remaining battery power at the point of time of the start of the charging operation, the output current of the constant current circuit 66, the counting value of the charging timer, and the like. Subsequently, the flow proceeds to the processing in Step S331.

In Step S331, the sub-controller 63 transmits the information such as the remaining battery power, the estimated charging time, and the like, calculated in the aforementioned Step S330, to the DSC controller 13. Subsequently, the flow returns to the processing in Step S302 shown in FIG. 19, and the following processing is repeated.

Note that an arrangement may be made wherein the information values (e.g., the remaining battery power and the estimated charging time) calculated by the sub-controller 63 are multiplied by a predetermined coefficient of 1 or more, and the computed results are transmitted to the DSC controller 13, in the aforementioned Step S331.

Subsequently, the DSC controller 13 displays the charging-state information in a predetermined layout using the liquid crystal monitor 15 based upon the information transmitted from the sub-controller 63 as described above.

Note that the charging-state information displayed on the liquid crystal monitor 15 is nothing more than an indicator during the charging operation, and that there is no problem even in the event that the charging operation is completed earlier than the estimated charging time displayed on the liquid crystal monitor 15.

As described above, with the print system according to the above-described embodiment, formed of the digital camera 10 and the printer 60 for printing an image corresponding to the image data taken and acquired by the digital camera, the system has a configuration wherein electric power is supplied from the printer 60 to the secondary battery 64 employed in the digital camera 10 so as to charge the secondary battery 64, as well as displaying the state of the secondary battery 64 using the display unit of the liquid crystal monitor 15 (display means) of the digital camera 10 for the user confirming the state of the secondary battery 64, thereby improving operability and ease of use of the user.

Furthermore, in this case, display arrangement is displayed on the display unit of the liquid crystal monitor 15 in an improved layout suitable for the operation state of the digital camera 10 and the printer 60, thereby further improving operability and ease of use of the user.

That is to say, with the present embodiment, the print system formed of a digital camera and a printer for printing an image corresponding to the image data received from the digital camera, the aforementioned print system has a configuration wherein electric power can be supplied to a secondary battery employed in the digital camera from the printer, as well as displaying the state of the secondary battery with display means of the digital camera in an improved layout, using improved layout-selecting means, improved display-selecting means, or the like, for the user confirming the state of the secondary battery, thereby providing a print system having improved operability and ease of use of the user.

In this invention, it is apparent that embodiments different in a wide range can be formed on this basis of this invention without departing from the spirit and scope of the invention. This invention is not restricted by any specific embodiment except being limited by the appended claims.

What is claimed is:

1. A print system formed of a digital camera and a printer, each including control means for controlling operations thereof, functionally connected one to another;

wherein the digital camera has a configuration wherein data forming an image which is to be printed with the printer can be supplied to the printer, a secondary battery, which is a power source thereof, can be charged by receiving electric power supplied from the printer, wherein a state of each function including a state of the secondary battery can be displayed on a predetermined display unit, under control of the control means thereof;

wherein the printer has a configuration wherein an image can be printed based upon the image data supplied from the digital camera, and electric power can be supplied to the digital camera so as to charge the secondary battery thereof, under control of the control means thereof;

wherein the digital camera has a configuration wherein in the event that the digital camera and the printer are functionally connected one to another, a display is displayed on the predetermined display unit thereof for notifying the state of the secondary battery; and wherein a first display arrangement wherein an image which is to be printed, or which is a candidate to be printed, is displayed as a main display with a relatively large size, and a display for notifying the state of the secondary battery is displayed as a sub-display with a relatively small size, on the same screen on the predetermined display unit of the digital camera, and a second display arrangement wherein a display for notifying the state of the secondary battery is displayed as a main display with a relatively large size, and an image which is to be printed, or which is a candidate to be printed, is displayed as a sub-display with a relatively small size, on the same screen, are freely selected by the user, under control of the control means.

2. A print system formed of a digital camera and a printer, each including control means for controlling operations thereof, functionally connected one to another;

wherein the digital camera has a configuration wherein data forming an image which is to be printed with the printer can be supplied to the printer, a secondary battery, which is a power source thereof, can be charged by receiving electric power supplied from the printer, wherein a state of each function including a state of the secondary battery can be displayed on a predetermined display unit, under control of the control means thereof;

wherein the printer has a configuration wherein an image can be printed based upon the image data supplied from the digital camera, and electric power can be supplied to the digital camera so as to charge the secondary battery thereof, under control of the control means thereof;

wherein the digital camera has a configuration wherein in the event that the digital camera and the printer are functionally connected one to another, a display is displayed on the predetermined display unit thereof for notifying the state of the secondary battery; and wherein in a case that a display is performed for an image which is to be printed, or which is a candidate to be printed, on the predetermined display unit of the digital camera, and the user performs no operation for the digital camera for a predetermined second period of time or more, and in the event the secondary battery is not being presently charged, the display is turned off, and on the other hand, in the event that the secondary battery is being presently charged, the display is automatically switched to a display for notifying the state of the secondary battery, and furthermore, in the event that the display is performed for notifying the state of the secondary battery due to the switching, and the user performs no operation for the digital camera for a predetermined first period of time or more, the display is turned off, under control of the control means.

3. A print system formed of a digital camera and a printer, each including control means for controlling operations thereof, functionally connected one to another, wherein the digital camera includes: image data transmitting means for supplying image data forming an image which is to be printed with the printer, of the image data acquired by the image-taking means, to the printer, under control of the control means thereof and the control means of the printer, communicating with each other; a charging circuit for charging a secondary battery employed as a power source thereof by receiving electric power supplied from the printer; a battery monitoring circuit unit for detecting and monitoring a state of the secondary battery, and supplying the detected state to the control means of the digital camera; display means for displaying a state of each function including the state of the secondary battery on a predetermined display unit under control of the control means of the digital camera and an operation unit for receiving operations performed by the user;

wherein the printer includes: image data receiving means for receiving image data supplied from the digital camera, under control of the control means thereof and the control means of the digital camera, communicating with each other; printing means having a configuration wherein an image can be printed based upon the received image data; and an electric power supply circuit having a configuration wherein electric power can be supplied to the digital camera so as to charge the secondary battery;

wherein the digital camera has a configuration wherein the information with regard to the state of the secondary battery detected and acquired by the battery monitoring circuit unit at the time of the start of the print system is displayed on the predetermined display unit under control of the control means thereof; and wherein the digital camera has a configuration wherein a first display arrangement wherein an image which is to be printed, or which is a candidate to be printed, is displayed as a main display with a relatively large size, and a display for notifying the state of the secondary battery is displayed as a sub-dlisplay with a relatively small size, on the same screen on the display unit of the digital camera, and a second display arrangement wherein a display for notifying the state of the secondary battery is displayed as a main display with a relatively large size, and an image which is to be printed, or which is a candidate to be printed, is displayed as a sub-display with a relatively small size, on the same screen, are freely selected by the user performing operations for the operation unit, under control of the control means thereof.

4. A print system formed of a digital camera and a printer, each including control means for controlling operations thereof, functionally connected one to another, wherein the digital camera includes: image data transmitting means for supplying image data forming an image which is to be printed with the printer, of the image data acquired by the image-taking means, to the printer, under control of the control means thereof and the control means of the printer, communicating with each other; a charging circuit for charging a secondary battery employed as a power source thereof by receiving electric power supplied from the printer; a battery monitoring circuit unit for detecting and monitoring a state of the secondary battery, and supplying the detected state to the control means of the digital camera; display means for displaying a state of each function including the state of the secondary battery on a predetermined display unit under control of the control means of the digital camera and an operation unit for receiving operations performed by the user;

wherein the printer includes: image data receiving means for receiving image data supplied from the digital camera, under control of the control means thereof and the control means of the digital camera, communicating with each other; printing means having a configuration wherein an image can be printed based upon the received image data; and an electric power supply circuit having a configuration wherein electric power can be supplied to the digital camera so as to charge the secondary battery;

wherein the digital camera has a configuration wherein the information with regard to the state of the secondary battery detected and acquired by the battery monitoring circuit unit at the time of the start of the print system is displayed on the predetermined display unit under control of the control means thereof; and wherein the digital camera has a configuration wherein in a case that a display is performed for an image which is to be printed, or which is a candidate to be printed, on the display unit, and the user performs no operation for the operation unit for a predetermined second period of time or more, and in the event the secondary battery is not being presently charged, the display is turned off, and on the other hand, in the event that the secondary battery is being presently charged, the display is automatically switched to a display for notifying the state of the secondary battery, and furthermore, in the event that the display is performed for notifying the state of the secondary battery due to the switching, and the user performs no operation for the operation unit for a predetermined first period of time or more, the display is turned off, under control of the control means thereof.

5. A digital camera employed for a print system formed of the digital camera and a printer, each including control means for controlling operations thereof, functionally connected one to another, the digital camera comprising:

image taking means for obtaining image data corresponding to a subject;

image data transmitting means for supplying the image data forming an image which is to be printed with the printer, of the image data acquired by the image-taking means, to the printer, under control of the control means thereof and the control means of the printer, communicating with each other;

a charging circuit for charging a secondary battery employed as a power source thereof by receiving electric power supplied from the printer;

a battery monitoring circuit unit for detecting and monitoring a state of the secondary battery, and supplying the detected state to the control means thereof;

display means for displaying a state of each function including the state of the secondary battery on a predetermined display unit under control of the control means thereof; and an operation unit for receiving operations performed by the user, wherein a first display arrangement wherein an image which is to be printed, or which is a candidate to be printed, is displayed as a main display with a relatively large size, and a display for notifying the state of the secondary battery is displayed as a sub-display with a relatively small size, on the same screen on the display unit, and a second display arrangement wherein a display for notifying the state of the secondary battery is displayed as a main display with a relatively large size, and an image which is to be printed, or which is a candidate to be printed, is displayed as a sub-display with a relatively small size, on the same screen, are freely selected by the user performing operations for the operation unit, under control of the control means thereof.

6. A digital camera employed for a print system formed of the digital camera and a printer, each including control means for controlling operations thereof, functionally connected one to another, the digital camera comprising:

image taking means for obtaining image data corresponding to a subject;

image data transmitting means for supplying the image data forming an image which is to be printed with the printer, of the image data acquired by the image-taking means, to the printer, under control of the control means thereof and the control means of the printer, communicating with each other;

a charging circuit for charging a secondary battery employed as a power source thereof by receiving electric power supplied from the printer;

a battery monitoring circuit unit for detecting and monitoring a state of the secondary battery, and supplying the detected state to the control means thereof;

display means for displaying a state of each function including the state of the secondary battery on a predetermined display unit under control of the control means thereof; and an operation unit for receiving operations performed by the user, wherein in a case that a display is performed for an image which is to be printed, or which is a candidate to be printed, on the display unit, and the user performs no operation for the operation unit for a predetermined second period of time or more, and in the event that the secondary battery is not being presently charged, the display is turned off, and on the other hand, in the event that the secondary battery is being presently charged, the display is automatically switched to a display for notifying the state of the secondary battery, and furthermore, in the event that the display is performed for notifying the state of the secondary battery due to the switching, and the user performs no operation for the operation unit for a predetermined first period of time or more, the display is turned off, under control of the control means thereof.

7. A print system formed of a digital camera and a printer, each including control means for controlling operations thereof, functionally connected one to another;

wherein the digital camera has a configuration wherein data forming an image which is to be printed with the printer can be supplied to the printer, a secondary battery, which is a power source thereof, can be charged by receiving electric power supplied from the printer, wherein a state of each function including a state of the secondary battery can be displayed on a predetermined display unit, under control of the control means thereof;

wherein the printer has a configuration wherein an image can be printed based upon the image data supplied from the digital camera, and electric power can be supplied to the digital camera so as to charge the secondary battery thereof, under control of the control means thereof; and wherein a first display arrangement wherein an image which is to be printed, or which is a candidate to be printed, is displayed as a main display with a relatively large size, and a display for notifying the state of the secondary battery is displayed as a sub-display with a relatively small size, on the same screen on the predetermined display unit of the digital camera, and a second display arrangement wherein a display for notifying the state of the secondary battery is displayed as a main display with a relatively large size, and an image which is to be printed, or which is a candidate to be printed, is displayed as a sub-display with a relatively small size, on the same screen, are freely selected by the user, under control of the control means.

8. A print system formed of a digital camera and a printer, each including control means for controlling operations thereof, functionally connected one to another;

wherein the digital camera has a configuration wherein data forming an image which is to be printed with the printer can be supplied to the printer, a secondary battery, which is a power source thereof, can be charged by receiving electric power supplied from the printer, wherein a state of each function including a state of the secondary battery can be displayed on a predetermined display unit, under control of the control means thereof;

wherein the printer has a configuration wherein an image can be printed based upon the image data supplied from the digital camera, and electric power can be supplied to the digital camera so as to charge the secondary battery thereof, under control of the control means thereof; and wherein in a case that a display is performed for an image which is to be printed, or which is a candidate to be printed, on the predetermined display unit of the digital camera, and the user performs no operation for the digital camera for a predetermined second period of time or more, and in the event the secondary battery is not being presently charged, the display is turned off, and on the other hand, in the event that the secondary battery is being presently charged, the display is automatically switched to a display for notifying the state of the secondary battery, and furthermore, in the event that the display is performed for notifying the state of the secondary battery due to the switching, and the user performs no operation for the digital camera for a predetermined first period of time or more, the display is turned off, under control of the control means.

9. A print system formed of a digital camera and a printer, each including control means for controlling operations thereof, functionally connected one to another, wherein the digital camera includes: image data transmitting means for supplying image data forming an image which is to be printed with the printer, of the image data acquired by the image-taking means, to the printer, under control of the control means thereof and the control means of the printer, communicating with each other; a charging circuit for charging a secondary battery employed as a power source thereof by receiving electric power supplied from the printer; a battery monitoring circuit unit for detecting and monitoring a state of the secondary battery, and supplying the detected state to the control means of the digital camera; display means for displaying a state of each function including the state of the secondary battery on a predetermined display unit under control of the control means of the digital camera and an operation unit for receiving operations performed by the user;

wherein the printer includes: image data receiving means for receiving image data supplied from the digital camera, under control of the control means thereof and the control means of the digital camera, communicating with each other; printing means having a configuration wherein an image can be printed based upon the received image data; and an electric power supply circuit having a configuration wherein electric power can be supplied to the digital camera so as to charge the secondary battery; and wherein the digital camera has a configuration wherein a first display arrangement wherein an image which is to be printed, or which is a candidate to be printed, is displayed as a main display with a relatively large size, and a display for notifying the state of the secondary battery is displayed as a sub-display with a relatively small size, on the same screen on the display unit of the digital camera, and a second display arrangement wherein a display for notifying the state of the secondary battery is displayed as a main display with a relatively large size, and an image which is to be printed, or which is a candidate to be printed, is displayed as a sub-display with a relatively small size, on the same screen, are freely selected by the user performing operations for the operation unit, under control of the control means thereof.

10. A print system formed of a digital camera and a printer, each including control means for controlling operations thereof, functionally connected one to another, wherein the digital camera includes: image data transmitting means for supplying image data forming an image which is to be printed with the printer, of the image data acquired by the image-taking means, to the printer, under control of the control means thereof and the control means of the printer, communicating with each other; a charging circuit for charging a secondary battery employed as a power source thereof by receiving electric power supplied from the printer; a battery monitoring circuit unit for detecting and monitoring a state of the secondary battery, and supplying the detected state to the control means of the digital camera; display means for displaying a state of each function including the state of the secondary battery on a predetermined display unit under control of the control means of the digital camera and an operation unit for receiving operations performed by the user;

wherein the printer includes: image data receiving means for receiving image data supplied from the digital camera, under control of the control means thereof and the control means of the digital camera, communicating with each other; printing means having a configuration wherein an image can be printed based upon the received image data; and an electric power supply circuit having a configuration wherein electric power can be supplied to the digital camera so as to charge the secondary battery; and wherein the digital camera has a configuration wherein in a case that a display is performed for an image which is to be printed, or which is a candidate to be printed, on the display unit, and the user performs no operation for the operation unit for a predetermined second period of time or more, and in the event the secondary battery is not being presently charged, the display is turned off, and on the other hand, in the event that the secondary battery is being presently charged, the display is automatically switched to a display for notifying the state of the secondary battery, and furthermore, in the event that the display is performed for notifying the state of the secondary battery due to the switching, and the user performs no operation for the operation unit for a predetermined first period of time or more, the display is turned off, under control of the control means thereof.

* * * * *